(12) United States Patent
Suzuki et al.

(10) Patent No.: US 7,439,317 B2
(45) Date of Patent: Oct. 21, 2008

(54) AMORPHOUS POLYESTER CHIP AND METHOD FOR PRODUCTION THEREOF, AND METHOD FOR STORAGE OF AMORPHOUS POLYESTER CHIP

(75) Inventors: Keisuke Suzuki, Iwakuni (JP); Hiroki Fukuda, Iwakuni (JP); Hideki Shimizu, Tsuruga (JP); Tsuyoshi Matsunaga, Tsuruga (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 4 days.

(21) Appl. No.: 10/879,187

(22) Filed: Jun. 30, 2004

(65) Prior Publication Data

US 2004/0236063 A1  Nov. 25, 2004

Related U.S. Application Data

(63) Continuation of application No. PCT/JP03/04605, filed on Apr. 11, 2003.

(30) Foreign Application Priority Data

Apr. 11, 2002  (JP) ............................. 2002-109688

(51) Int. Cl.
  *C08G 63/00* (2006.01)
  *C08G 63/66* (2006.01)
  *C08G 63/16* (2006.01)
  *C08G 18/08* (2006.01)
  *C08G 18/42* (2006.01)
  *C08F 6/00* (2006.01)
  *C08K 3/02* (2006.01)
  *C08K 3/32* (2006.01)
  *C08K 3/38* (2006.01)
  *C08K 5/49* (2006.01)

(52) U.S. Cl. ................ 528/275; 528/279; 528/283; 528/285; 528/286; 528/300; 528/302; 528/307; 528/308; 528/308.6; 528/485; 528/487; 528/488; 528/503; 524/706; 524/779; 524/783; 428/35.7; 428/221; 428/35.9

(58) Field of Classification Search ................ 528/275, 528/279, 283, 285, 286, 300, 302, 307, 308, 528/308.6, 485, 487, 488, 503; 524/706, 524/779, 783; 428/35.7, 221, 34.9
See application file for complete search history.

(56) References Cited

U.S. PATENT DOCUMENTS

| | | | |
|---|---|---|---|
| 3,014,011 A | | 12/1961 | Zoetbrood |
| 3,349,499 A | | 10/1967 | Katano |
| 3,977,050 A | * | 8/1976 | Perez .......................... 206/346 |
| 4,176,101 A | * | 11/1979 | Leslie et al. ................. 524/230 |
| 4,254,253 A | * | 3/1981 | Brent et al. ................. 528/272 |
| 5,573,820 A | * | 11/1996 | Harazoe et al. ............ 428/35.7 |
| 6,020,056 A | * | 2/2000 | Walker et al. ............... 428/323 |
| 6,610,378 B1 | * | 8/2003 | Kimura et al. ............. 428/35.8 |

FOREIGN PATENT DOCUMENTS

JP  2001-348425  12/2001

* cited by examiner

*Primary Examiner*—Nathan M Nutter
(74) *Attorney, Agent, or Firm*—Westerman, Hattori, Daniels & Adrian, LLP.

(57) ABSTRACT

An amorphous polyester chip having superior processing ability is characterized by a moisture content of not more than 300 ppm and a fine particle content of not more than 500 ppm. A preferred embodiment is a copolymerized polyester chip comprising a main repeating unit consisting of ethylene terephthalate, and 1,4-dimethylene-cyclohexane terephthalate or neopentyl terephthalate, wherein the glycol component of the copolymerized polyester has a specific composition of 50 to 85 mol % of ethylene glycol, 12 to 45 mol % of 1,4-cyclohexanedimethanol or neopentyl glycol and 1.5 to 7.0 mol % of diethylene glycol. Such amorphous polyester chip can be obtained by cooling an amorphous polyester obtained by melt polymerization, cutting the polyester to give a chip, feeding the chip in a treatment tank, drying the chip and removing fine particles.

8 Claims, 2 Drawing Sheets

AMORPHOUS POLYESTER CHIP AND METHOD FOR PRODUCTION THEREOF, AND METHOD FOR STORAGE OF AMORPHOUS POLYESTER CHIP

This application is a continuation of international application PCT/JP03/04605 filed on Apr. 11, 2003.

TECHNICAL FIELD

The present invention relates to amorphous polyester chip and a production method thereof, and a preservation method of such amorphous polyester chip. More particularly, the present invention relates to an amorphous polyester chip comprising a major repeating unit consisting of ethylene terephthalate, and 1,4-dimethylene-cyclohexane terephthalate or neopentyl terephthalate, a production method thereof, and a preservation method thereof.

BACKGROUND ART

Polyesters, particularly polyethylene terephthalate (PET) produced from ethylene glycol and terephthalic acid as starting materials, are used for a broad range of products such as containers, films, sheets, and fibers because such polyesters are superior in chemical and physical properties.

In recent years, a polyester obtained by copolymerizing this polyethylene terephthalate (PET) with 1,4-cyclohexanedimethanol (hereinafter abbreviated as CHDM) has drawn attention because of its superiority in transparency, impact resistance, formability, heat resistance and other parameters, and has been increasingly employed for various uses, particularly film (sheet), engineering plastic and other materials.

Similarly, a polyester obtained by copolymerizing polyethylene terephthalate (PET) with neopentyl glycol (hereinafter to be also abbreviated as NPG) has drawn attention because of its superiority in transparency and impact resistance as disclosed in JP-A-2000-109546.

Polyester can be produced from dicarboxylic acid or dialkyl ester thereof, and glycol as starting material monomers, by the steps of esterification reaction or transesterification reaction to give diester of dicarboxylic acid and glycol and/or oligomer thereof, and heating this product under reduced pressure to allow for polycondensation reaction until a desired degree of polymerization is achieved. In general terms, the thus—obtained polyester is subsequently continuously extruded from plural nozzles of a die in strands of molten resin from a reactor, cooled with a cooling medium such as water, cut in a suitable size (pelletized) and shipped as a starting material pellet (chip) for molding.

When the polyester chip has a high moisture content, the molecular weight of the polyester decreases in the subsequent melt extrusion step, and the subsequently formed products problematically have a lower mechanical strength. To avoid this in the production of polyester, polyester chips are generally dried in a dryer to give a final product. For drying polyester chips, a drying apparatus is generally used in view of drying efficiency, convenience and similar desirable properties.

However, as a result of the study of the present inventors, it has been found that, in the case of amorphous polyester chip wherein PET is copolymerized with 1,4-cyclohexanedimethanol, neopentyl glycol and the like, an increase in fine particles i.e., finely divided powder) is produced from the polyester chip during drying in a drying apparatus (e.g., batch type dryer, hopper type dryer with a stirrer etc.), and the finely divided powder exerts an adverse influence on the quality of subsequently formed products.

In other words, generation of fine particles causes segregation when mixing plural chips, which in turn poses difficulty in production of subsequently formed products having a uniform composition, resulting in quality variation of formed products. Furthermore, while the reason is unknown, moreover, it has also been found that a large content of fine particles degrades transparency.

As used herein, by "segregation" is meant, for example, a phenomenon wherein during a step of forming a mixture of two or more kinds of starting material chips, the presence of fine particles (finely divided powder) results in a chip mixture being unevenly distributed in a silo or hopper, causing inconsistent mixing ratio of the chip mixture during film forming, thereby resulting in greater variations of the polymer composition of the final film product. For example, when a segregated chip mixture is used for film production, the polymer composition of the film is deviated from uniform in the film running direction, which in turn causes problems of variation in the film properties (e.g., heat shrink property, mechanical strength etc.), inconsistent thickness and other undesirable properties.

In addition, when amorphous polyester chips are dried using a drying apparatus (e.g., batch type dryer, hopper type dryer with a stirrer etc.), individual chips are melted with each other and integrated due to the heat, and such melted chips degrade workability of drying process and subsequent forming process. The reason is that, although melting of chips does not occur readily in the case of crystalline polyesters such as PET, PBT, PEN and others, because polyester is crystallized by drying with heating, in the case of amorphous polyesters, crystallization does not occur.

Crude by-products resulting from the production process of polyester chips include large chips having a greater size than a specified size by-produced during pelletization (chip formation) and crude products resulting from the shape change of chips (film formation) during a drying step. It has been found that these are produced in a comparatively trace amount, and these alone do not readily give rise to a problem, however, once melted chips are produced, the chips cannot be taken out from the drying apparatus readily or chips are clogged in an input line, an inlet and the like in a forming machine during forming, and the forming process cannot be completed stably.

As regards drying of polyester chips, JP-A-2001-348425 proposes a method comprising washing polyester chip with water and drying by heating with the aim of removing oligomers such as cyclic trimer and the like from crystalline polyester.

The present invention has been made in view of the abovementioned situation, wherein a first object is to provide an amorphous polyester chip capable of producing a subsequently formed product having a uniform polymer composition and a production method thereof, as well as a preservation method of the amorphous polyester chip. Particularly, the object is to provide an amorphous polyester chip capable of increasing processing operability during subsequent forming, and efficiently producing a subsequently formed product having a uniform polymer composition and a production method thereof, as well as a preservation method of the amorphous polyester chip.

A second object of the present invention is to provide an amorphous polyester chip capable of producing a subsequently formed product (particularly film) having a uniform polymer composition and superior in transparency and solvent adhesiveness, and a production method thereof, as well as a preservation method of the amorphous polyester chip.

A third object of the present invention is to provide an amorphous polyester chip having a uniform polymer composition and a high degree of polymerization, and capable of producing a film having superior mechanical strength, and a production method thereof, as well as a preservation method of the amorphous polyester chip.

A fourth object of the present invention is to provide an amorphous polyester chip having a uniform polymer composition and capable of efficiently producing a film superior in uniform thickness, and a production method thereof, as well as a preservation method of the amorphous polyester chip.

DISCLOSURE OF THE INVENTION

The present inventors have conducted intensive studies with the aim of achieving the above-mentioned object, and obtained the following findings, which resulted in the completion of the amorphous polyester chip of the present invention.

(a) By designing a drying method of a chip, a product formed from the chips (particularly film) having a uniform polymer composition can be obtained.

(b) By copolymerization of PET with a specific amount of diethylene glycol together with a specific amount of 1,4-cyclohexanedimethanol or neopentyl glycol, a subsequently formed product (particularly film) of polyester, which is superior in transparency and solvent adhesiveness, can be obtained.

(c) The use of a specific amount of at least one kind selected from an antimony compound, a germanium compound and a titanium compound as a polymerization catalyst increases a degree of polymerization of polyester and can produce a subsequently formed product superior in mechanical strength without thermal decomposition during the forming step (particularly film forming).

(d) Moreover, addition of a specific amount of an alkali metal compound, an alkaline earth metal compound and a phosphorus compound results in an amorphous polyester showing low melt specific resistance and superior electrostatic adhesion. Using this as a film starting material and an electrostatic adhesion casting method, a film is produced that shows improved uniform thickness of the film.

Accordingly, the present invention provides the following.

(1) An amorphous polyester chip having a moisture content of 300 ppm or less, which comprises fine particles in a content of 500 ppm or less.

(2) The amorphous polyester chip of the above-mentioned (1), having a crude by-product content of not more than 2 wt %.

(3) The amorphous polyester chip of the above-mentioned (1) or (2), which is a copolymerized polyester chip comprising a major repeating unit consisting of ethylene terephthalate, and 1,4-dimethylene-cyclohexane terephthalate or neopentyl terephthalate.

(4) The amorphous polyester chip of the above-mentioned (3), wherein the copolymerized polyester chip comprises terephthalic acid as a major dicarboxylic acid component, and 50 to 85 mol % of ethylene glycol, 12 to 45 mol % of 1,4-cyclohexanedimethanol or neopentyl glycol and 1.5 to 7.0 mol % of diethylene glycol, each relative to the entire glycol component.

(5) The amorphous polyester chip of the above-mentioned (3), wherein the copolymerized polyester is obtained using, as a polymerization catalyst, at least one kind selected from an antimony compound, a germanium compound and a titanium compound, and is a polyester comprising an amount satisfying any of not less than 0.009 mol % of an antimony compound, not less than 0.005 mol % of a germanium compound and not less than 0.002 mol % of a titanium compound, and all of not more than 0.045 mol % of an antimony compound, not more than 0.075 mol % of a germanium compound and not more than 0.023 mol % of a titanium compound, all relative to said polyester, and showing an intrinsic viscosity of 0.70 to 0.85 dl/g.

(6) The amorphous polyester chip of the above-mentioned (3) wherein the copolymerized polyester comprises ethylene terephthalate and 1,4-dimethylene-cyclohexane terephthalate as major repeating units and is a polyester which comprises an alkali metal compound, an alkaline earth metal compound and a phosphorus compound, and which comprises an alkali metal compound (M1), an alkaline earth metal compound (M2) and a phosphorus compound (P) in proportions satisfying the following formulas (I) to (IV), relative to said polyester:

$$0.005 \leq M1(\text{mol \%}) \leq 0.029 \quad \text{(I)}$$

$$0.045 \leq M2(\text{mol \%}) \leq 0.225 \quad \text{(II)}$$

$$1.67 \leq M2/M1 \text{ (molar ratio)} \leq 45 \quad \text{(III)}$$

$$0.5 \leq (M1+M2)/P(\text{molar ratio}) < 3.0 \quad \text{(IV)}$$

(7) The amorphous polyester chip of the above-mentioned (3) wherein the copolymerized polyester comprises ethylene terephthalate and neopentyl terephthalate as major repeating units and is a polyester which comprises an alkali metal compound, an alkaline earth metal compound and a phosphorus compound, and which comprises an alkali metal compound (M1), an alkaline earth metal compound (M2) and a phosphorus compound (P) in proportions satisfying the following formulas (V) to (VII), relative to said polyester:

$$0.005 \leq M1(\text{mol \%}) \leq 0.050 \quad \text{(V)}$$

$$0.05 \leq M2(\text{mol \%}) \leq 0.40 \quad \text{(VI)}$$

$$1.0 < M2/P(\text{molar ratio}) \leq 3.5 \quad \text{(VII)}$$

(8) An amorphous polyester chip in a moisture-proof container, which houses and seals an amorphous polyester chip of any of the above-mentioned (1) to (7) in a moisture-proof container.

(9) A production method of an amorphous polyester chip, which comprises
cooling an amorphous polyester obtained by melt polymerization, followed by cutting to provide a chip,
charging the chip into a treatment tank of a fluidized bed type drying apparatus, and
drying the chip by flowing a dry gas during passage of the chip through the tank.

(10) The method of the above-mentioned (9), wherein the dry gas to be flown through the treatment tank of the drying apparatus has a moisture content of not more than 100 ppm.

(11) The method of the above-mentioned (9) or (10), wherein the treatment tank of the drying apparatus has an inside temperature of not lower than room temperature and lower than the glass transition temperature of an amorphous polyester by not less than 10° C.

(12) A production method of an amorphous polyester chip, which comprises
cooling an amorphous polyester obtained by melt polymerization, followed by cutting to provide a chip, drying the chip by vacuum drying or by flowing a small amount of a dry gas under vacuum in a treatment tank of a drying apparatus, and then
transporting the chip to a fine particle removing apparatus to remove fine particles without allowing contact with outside air.

(13) The method of the above-mentioned (12), wherein the dry gas to be flown through the treatment tank of the drying apparatus has a moisture content of not more than 100 ppm.

(14) The method of the above-mentioned (12) or (13), wherein the treatment tank of the drying apparatus has an inside temperature of not lower than room temperature and lower than the glass transition temperature of an amorphous polyester by not less than 10° C.

(15) A preservation method of an amorphous polyester chip, which comprises preservation of the amorphous polyester chip produced by the method of any of the above-mentioned (9) to (14) without allowing contact with outside air in a moisture-proof container.

(16) A polyester film obtained by forming a film starting material comprising the amorphous polyester chip of any of the above-mentioned (1) to (8) as a part or the entirety thereof.

BRIEF DESCRIPTION OF THE DRAWINGS

In FIG. 1 and FIG. 2, 1 shows a chip (amorphous polyester chip), 2 shows a dry gas, 3 shows an exhaust gas containing moisture, 10 shows a drying tower (silo), 11 shows a chip supply opening, 12 shows a dry gas supply line, 13 shows a chip outlet, and 14 shows a moisture-proof container.

DETAILED DESCRIPTION OF THE INVENTION

Figure 1:
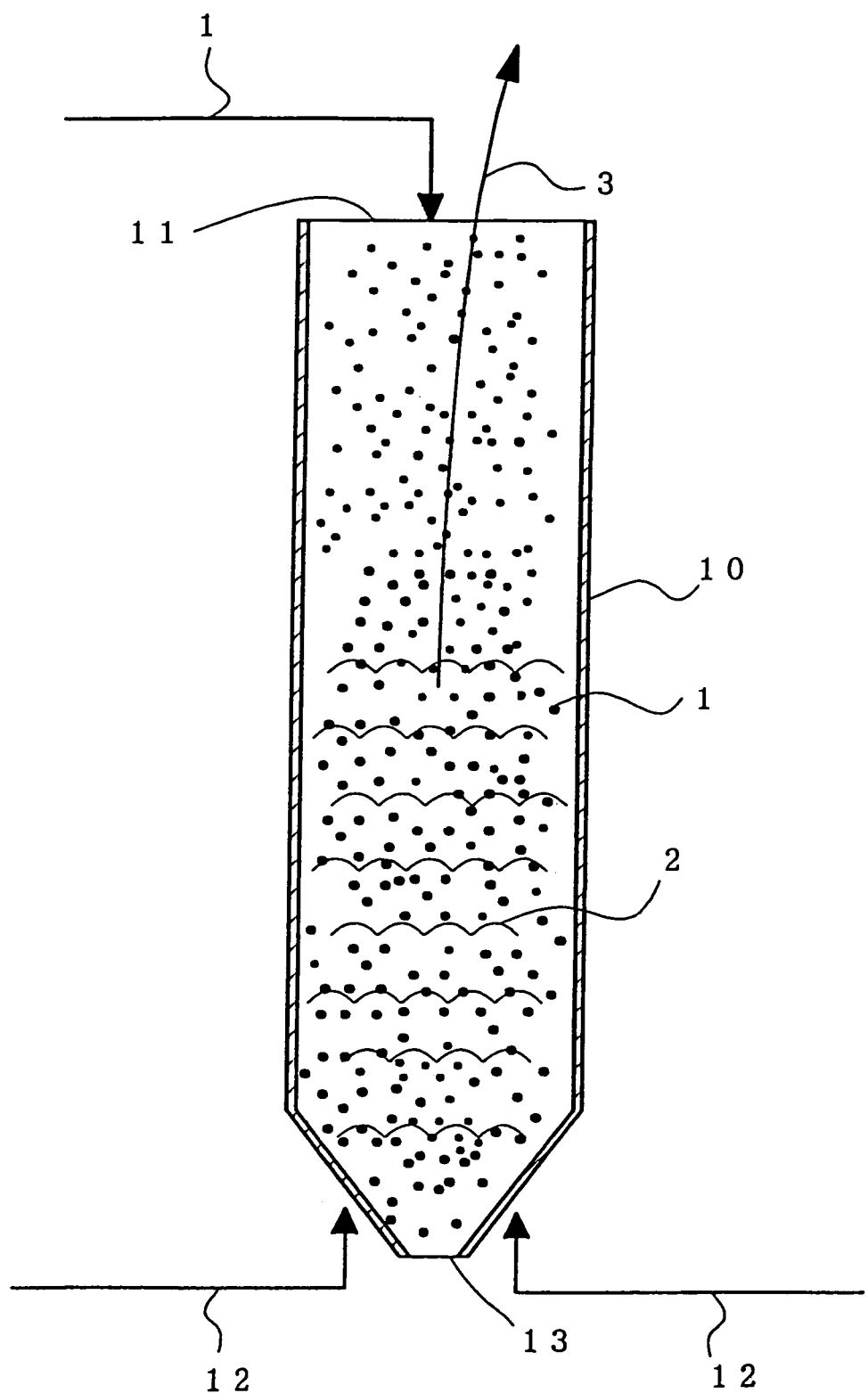
FIG. 1 is a simplified sectional view showing a silo type through-flow dryer, which is one embodiment of the fluidized bed type drying apparatus to be used for the production of an amorphous polyester chip of the present invention.

The present invention is explained in detail in the following.

The amorphous polyester chips of the present invention is characterized in that the chips as a whole have a moisture content of not more than 300 ppm and a fine particle content of not more than 500 ppm. Preferably, the amorphous polyester chip of the present invention has a moisture content of not more than 50 ppm and a fine particle content of not more than 100 ppm.

The amorphous polyester chips of the present invention preferably satisfies the above-mentioned low moisture content and small fine particle content, as well as having a crude by-product content of not more than 2 wt % (preferably not more than 0.5 wt %).

In the present invention, "amorphous polyester" means a polyester that does not show a clear melting peak using a differential scanning calorimeter (DSC) following a process of raising the polyester at a rate of 20° C./min from −100° C. to 300° C., followed by immediate cooling with liquid nitrogen, and raising again at a rate of 20° C./min from −100° C. to 300° C. When such temperature raising—temperature lowering—temperature raising process is performed, a polyester that shows a clear melting peak in at least one of the two temperature raising processes is not an "amorphous polyester" but a "crystalline polyester".

In addition, the "fine particle" in the present invention means a fine particle contained in a quantity of polyester chips produced by a polymerization step, a pelletizing step and a drying step, which is measured according to JIS-Z8801 as a particle that passes through a stainless net sieve of nominal size 1.7 mm, wire diameter 0.8 mm, and that does not pass through a glass filter having a pore size of 100 to 120 μm.

The "crude by-product" is a crude product contained in a quantity of polyester chips produced through a polymerization step, a pelletizing step and a drying step, which includes a crude chip having a larger size than the specified size and by-produced in a pelletizing step, a melted chip produced by melt-adhesion of chips in a chip drying step, a film-like product resulting from shape change of chips and the like. The crude by-product is measured according to JIS-Z8801 as a by-product collected by passing through a stainless net sieve of nominal size 5.6 mm, wire diameter 1.6 mm, which, after washing with ion exchange water and filtering using a glass filter having a pore size of 100 to 120 μm, does not pass through the glass filter.

The above-mentioned chip having a specified size is preferably a chip having a size of length, width and height of each 1.5 to 4.0 mm.

The amorphous polyester chip of the present invention is a copolymerized polyester chip obtained by copolymerization of polyethylene terephthalate (PET) with a dicarboxylic acid component other than terephthalic acid and/or a glycol component other than ethylene glycol. The use of an amorphous copolymerized polyester chip as a film starting material provides superior transparency to subsequently produced PET.

In such a copolymerized polyester chip, the amount of the terephthalic acid component in the entire dicarboxylic acid component is preferably not less than 70 mol %, particularly preferably not less than 85 mol %, more preferably not less than 95 mol % and most preferably 100 mol %.

As other dicarboxylic acid components (copolymerization components) that can be used along with terephthalic acid, aromatic dicarboxylic acids such as isophthalic acid, 2,6-naphthalenedicarboxylic acid, diphenyl-4,4'-dicarboxylic acid, diphenoxyethanedicarboxylic acid and the like, oxy acids such as p-oxybenzoic acid, oxycaproic acid and the like, aliphatic dicarboxylic acids such as adipic acid, sebacic acid, succinic acid, glutaric acid and the like, alicyclic dicarboxylic acids such as 1,4-cyclohexanedicarboxylic acid and the like are examples. In the present invention, the dicarboxylic acid component includes ester-formable derivatives in a starting material stage before polymerization such as alkyl ester having about 1 to 4 carbon atoms and the like.

The amount of the ethylene glycol component in the entire glycol component is preferably not less than 50 mol %. When the amount of the ethylene glycol is less than 50 mol %, lower thermal stability, defective transparency, decreased molecular weight, lower polymerizability and the like readily occur. When the amount of the ethylene glycol exceeds 88 mol %, the crystallinity of resin becomes high and transparency is lost. Therefore, the amount of the ethylene glycol component is preferably not more than 88 mol %, more preferably not more than 87 mol % and most preferably not more than 85 mol %.

As the glycol component other than ethylene glycol, aliphatic glycols such as diethylene glycol, trimethylene glycol, tetramethylene glycol, neopentyl glycol and the like, alicyclic glycols such as 1,4-cyclohexanedimethanol and the like, aromatic glycols such as bisphenol A, and alkylene oxide adduct of bisphenol A and the like are examples, and one or more kinds glycol components are used. Of these, 1,4-cyclohexanedimethanol, diethylene glycol, neopentyl glycol and the like are preferable.

Such copolymerized polyester chip is preferably a copolymerized polyester (first copolymerized polyester) chip comprising ethylene terephthalate and 1,4-dimethylene-cyclohexane terephthalate as major repeating units, or a copolymerized polyester (second copolymerized polyester) chip comprising ethylene terephthalate and neopentyl terephthalate as major repeating units.

For the aforementioned copolymerized polyester to result in a chip capable of providing a subsequently formed product having fine composition uniformity and superior transparency and solvent adhesion, it is significant that the major dicarboxylic acid component of polyester be terephthalic acid and the glycol component have a composition of 50 to 85 mol % of ethylene glycol component, 12 to 45 mol % of 1,4-cyclohexanedimethanol or neopentyl glycol, and 1.5 to 7 mol % (preferably 2.5 to 5.0 mol %) of diethylene glycol.

Such glycol component results in fine transparency of polyester and a subsequently formed product thereof having superior solvent adhesiveness.

As used herein, the solvent adhesiveness means, for example, ease of adhesion when an organic solvent is applied to a part of a subsequently formed product such as a film and the like to allow swelling of polyester, and different parts of a subsequently formed product (or between different formed products) are adhered via a coated part of the organic solvent. For example, in a "heat shrinkable film" used for various labels and the like, inferior solvent adhesiveness of a film causes adhesion failure when covering a container with a heat shrinkable film.

A diethylene glycol component in a polyester is known to occur as a by-product when ethylene glycol is used as a polymerization starting material (monomer). However, a copolymerization amount of a diethylene glycol component of 1.5 to 7 mol % (preferably 2.5 to 5.0 mol %) relative to the entire glycol component in the aforementioned first copolymerized polyester chip is difficult to achieve unless diethylene glycol is used as a polymerization starting material (monomer), and is a composition stably controlled by the use of diethylene glycol as a polymerization starting material (monomer).

In other words, when a copolymerized polyester wherein PET is copolymerized with not less than 12 mol % of 1,4-cyclohexanedimethanol relative to the entire glycol component is to be obtained, it is difficult to make the amount of a diethylene glycol component in glycol component not less than 1.5 mol % only by controlling the polymerization reaction conditions (catalyst, temperature, pressure etc.).

In the present invention, a copolymerization content of diethylene glycol component of 1.5 to 7.0 mol % (preferably 2.5 to 5.0 mol %) relative to the entire glycol component is achieved by means of adding a specific amount of diethylene glycol, i.e., 0.5 to 6.5 mol % (preferably 1.0 to 5.5 mol %) of diethylene glycol relative to the entire glycol, to a charged starting material (monomer).

In the case of a copolymerized polyester having a copolymerization content of diethylene glycol of less than 1.5 mol % relative to the entire glycol component, fine solvent adhesiveness cannot be achieved, and in the case of a copolymerized polyester having a diethylene glycol amount exceeding 7.0 mol %, thermal decomposition occurs intensively during forming of polyester, and coloring of subsequently formed products, decreased molecular weight, generation of a by-product and lower properties occur.

On the other hand, for the aforementioned second copolymerized polyester chip comprising ethylene terephthalate and neopentyl terephthalate as major repeating units to result in a chip capable of providing a subsequently formed product having fine composition uniformity and superior transparency and solvent adhesion as well, it is significant that the major dicarboxylic acid component of polyester be terephthalic acid and the glycol component have a composition of 50 to 85 mol % of ethylene glycol component, 12 to 45 mol % of neopentyl glycol, and 1.5 to 7 mol % (preferably 2.5 to 5.0 mol %) of diethylene glycol. Such composition of the glycol component results in fine transparency of polyester and a subsequently formed product thereof having superior solvent adhesiveness.

The composition ratio of the neopentyl glycol component relative to the entire glycol component in the second copolymerized polyester is preferably 13 mol %, particularly preferably 15 mol %, for the lower limit, and preferably 40 mol %, particularly preferably 35 mol %, for the upper limit.

By setting the composition ratio of the neopentyl glycol component to not less than 12 mol % when, for example, a film is subsequently produced from such polyester chip and the film is used for forming purposes and compression-shaping or press forming of the film is performed, a deformation ratio of the film during subsequent forming can be increased, thus improving formability.

On the other hand, if the composition ratio of the neopentyl glycol component is not more than 45 mol %, the degree of polymerization of polyester increases, and a long duration is not required to reach a given intrinsic viscosity. As a result, degradation of color tone due to thermal history during polymerization can be suppressed. Furthermore, when a film is produced from such a copolymerized polyester chip, the film shows less color shift when multicolor printing is performed on the film, because the film does not show too high a heat shrink ratio, and the mechanical strength does not decrease.

The ethylene glycol component, which is the other major glycol component, is preferably 55 to 88 mol % relative to the entire glycol component, wherein the lower limit is more preferably 60 mol %, particularly preferably 65 mol %, and the upper limit is more preferably 87 mol %, particularly preferably 85 mol %.

For the use for subsequently formed products where solvent adhesiveness is not necessary and transparency is required, the entire glycol component of the polyester preferably consists substantially of ethylene glycol and neopentyl glycol in the second copolymerized polyester chip. However, the use of ethylene glycol and neopentyl glycol alone as glycol components of a polymerization starting material (monomer) in the absence of a basic compound such as triethylamine and the like having a diethylene glycol suppressive effect results in by-production of a certain amount of diethylene glycol, and in fact, a certain amount of a diethylene glycol component (not more than 3 mol % relative to the entire glycol component) may be contained.

In the amorphous polyester chip of the present invention, an amorphous copolymerized polyester preferably has an intrinsic viscosity of 0.60 to 0.90 dl/g, more preferably 0.65 to 0.85 dl/g, more preferably 0.70 to 0.85 dl/g. When the non-crystalline copolymerized polyester has an intrinsic viscosity of less than 0.60 dl/g, a fine particle (finely divided powder) content tends to increase during drying process and the like of a chip or a subsequently formed product tends to show lower mechanical properties. Particularly, for use for a subsequently formed product required to have a mechanical strength, an amorphous polyester preferably has an intrinsic viscosity of not less than 0.70 dl/g. On the other hand, when an amorphous polyester has an intrinsic viscosity exceeding 0.90 dl/g, thermal decomposition may occur intensively because resin temperature becomes high during melt extrusion in subsequent forming. As a result, problems readily occur such as increase in a free low molecular weight compound exerting an influence on aroma retention, coloring (yellowing) of subsequently formed product, and the like.

The glass transition temperature of an amorphous polyester of the present invention is preferably 60-90° C., particularly preferably 70-85° C., specifically preferably 75-85° C. When the glass transition temperature is lower than 60° C., chips readily melt-adhere during drying of chips, and heat resistance and mechanical properties of the subsequently formed product tend to decrease. In contrast, when the glass transition temperature exceeds 90° C., fine particles readily occur during production of chips (pelletizing) and drying of chips, and formability of subsequently produced articles decreases.

In addition, the amorphous polyester of the present invention preferably has a terminal carboxyl group concentration of 0 to 50 eq/ton, more preferably 0 to 40 eq/ton, particularly preferably 0 to 30 eq/ton. A polyester having a terminal carboxyl group concentration exceeding 50 eq/ton shows degraded hydrolysis stability and its molecular weight decreases during subsequent forming such as film forming and the like.

The amorphous polyester chip of the present invention is produced by synthesizing a polyester by a known method comprising subjecting a starting material monomer to an esterification reaction or a transesterification reaction and then melt polycondensation under reduced pressure, pelletizing the produced polyester, and drying the obtained chip by a particular drying process (drying step) to be mentioned below. In other words, it is produced by extruding a polymer obtained via an esterification reaction (transesterification reaction) and melt polycondensation from plural nozzles of a die from a reactor in strands, cooling with water, cutting into chips and drying the obtained chips by a particular drying process (drying step) to be mentioned below.

The melt polycondensation of polyester may be performed using a batch type reaction facility or a continuous type reaction facility. In either method, the melt polycondensation reaction may be performed in one step or plural steps. The polymer obtained by polycondensation after esterification reaction (transesterification reaction) is preferably filtered and then pelletized (chipped). For filtering, a filter having aperture of about 5 to 50 µm is generally used.

The shape of the chip may be any such as a cylinder shape, a square shape, a flat plate and the like. The size thereof is length, width, height of each generally 1.5 to 4.0 mm, preferably 1.8 to 4.0 mm, more preferably 2.0 to 4.0 mm. In the practical case of a cylinder shape, for example, the length is 1.5 to 4.0 mm, preferably 2 to 4.0 mm, and the diameter is about 1.5 to 4.0 mm, preferably 2.0 to 4.0 mm. The weight per one chip is practically 15 to 30 mg.

As a preferable production method of the amorphous polyester chip of the present invention, for example, the following method is an example.

A first method comprises melt polymerization as mentioned above, extrusion in strands from a nozzle of a die, cooling, cutting (pelletizing), placing the obtained amorphous polyester chips into a fluidized bed type drying apparatus, and passing them to dry the chips. As used herein, the "fluidized bed type" of the fluidized bed type drying apparatus means a method of flowing a chip with a dry gas flown from a bottom part of a drying apparatus to dry the chip. Specific examples of the fluidized bed type drying apparatus include a silo type through-flow drying machine wherein a polyester chip is supplied from an upper part and a dry gas is flown from a bottom part thereof (namely, a dryer designed such that moisture is discharged from the upper part of the silo to the outside, and dried chip is taken out to the outside from a take-out opening formed on the lowermost part of the silo) and the like.

FIG. 1 shows one concrete example of such silo type through-flow drying machine, and the drying machine is designed such that a chip 1 supplied from a chip supply opening 11 formed on an upper part of a drying tower (silo) 10 into the drying tower 10 is blown up by a dry gas 2 supplied from an air supply line 12 connected to the bottom part of the drying tower (silo) 10 into the tower and gradually falls while flowing, the moisture in the chip is discharged as an exhaust gas 3 to the outside, and the dried chip 1 is discharged from a chip outlet 13 formed on the lowermost part of the drying tower (silo) 10 to the outside.

In the present invention, the quantity of airflow of the dry gas used for drying the chip is generally preferably not less than 5 $m^3N/h$ and particularly preferably not less than 10 $m^3N/h$, per 1 ton of chips in a treatment tank of a drying apparatus (a drying tower (silo) in the case of a silo type through-flow drying machine). The upper limit of the quantity of airflow of a dry gas is generally 1000 $m^3N/h$. However, when the quantity of airflow is less than 5 $m^3N/h$ per 1 ton of chips, it is difficult to decrease the moisture content and when the quantity of airflow exceeds 1000 $m^3N/h$ per 1 ton of chips, it is sometimes difficult to control moisture content and flowability of the chips.

The number of the aforementioned air supply line 12 to be connected to the drying tower (silo) 10 needs to be increased along with increasing volumes of the silo, but it is generally 5 to 20.

By drying the amorphous polyester chip using a fluidized bed type drying apparatus, the chip is free of a strong impact from collision against the inner wall of a treatment tank and the like, and the moisture can be evaporated efficiently from the chip. As a result, the moisture content of the chip can be decreased to an object level of not more than 300 ppm while sufficiently suppressing the generation of fine particles.

In addition, by continuous operation of adding chips into a treatment tank and removing the chips from the treatment tank (discharge), the amorphous polyester chip of the present invention can be produced efficiently. As used herein, by continuous is meant continuously or intermittently discharging (taking out) a part of the chips and adding new chips while maintaining a treatment tank of a drying apparatus filled with chips.

A second method includes cooling and cutting into chips amorphous polyester produced by melt polymerization, drying the obtained chips in a drying apparatus by vacuum drying or drying while flowing a small amount of a dry gas in vacuo, transferring the chips to a fine particle removing apparatus without allowing contact with outside air and removing fine particles. That is, the above-mentioned first method reduces moisture while avoiding occurrence of fine particles as far as possible, but the second method dries the chip efficiently and removes fine particles produced in the process without increasing the moisture content of the chips.

The "vacuum" in vacuum drying here means setting the pressure in a treatment tank to not more than 400 Pa. When a small amount of dry gas is flown in vacuo, the quantity of airflow of the dry gas is preferably not less than 0.5 $m^3N/h$, particularly preferably not less than 1.0 m³N/h, per 1 ton of chips in a treatment tank. The upper limit of the quantity of airflow of the dry gas is generally not more than 5.0 m³N/h.

A drying apparatus is an apparatus that can control the inside of its treatment tank in vacuo or under pressurization, is capable of heating or cooling, can rotate about a fixed axis, and stirs and dries an object by its rotation, which is also called a batch type drying machine, a hopper type dryer with a stirrer and the like. As a fine particle removing apparatus, a vibrating filter apparatus, an air jet classifier based on air jet, a gravity classifier and the like are examples.

To supply a chip dry treated in a drying apparatus to a fine particle removing apparatus without allowing contact with outside air, a chip outlet (take-out opening) of a drying apparatus is connected with a fine particle removing apparatus by a transport pipe. Transport of chip by such transport pipe follows plug type pneumatic conveying or bucket conveyor transport, where occurrence of fine particle (finely divided powder) due to collision of chip with the inner wall of the pipe and other such surfaces is avoided.

In the present invention, a dry gas to be blown through a treatment tank of a drying apparatus (i.e., a silo type drying machine (drying tower) of a fluidized bed type drying apparatus, a treatment tank of a drying apparatus) preferably has a moisture content of not more than 100 ppm, particularly preferably not more than 1 ppm. As such dry gas, dry nitrogen, moisture-free air, helium gas, carbon dioxide gas and the like are examples, with preference given to dry nitrogen.

The temperature inside the treatment tank of a drying apparatus (temperature of dry gas when dry gas is flown) needs to be not lower than room temperature and lower by not less than 10° C. than the glass transition temperature (Tg) of an amorphous polyester. The aforementioned room temperature means 5-30° C. The lower limit of the temperature inside a treatment tank of a drying apparatus (temperature of dry gas when dry gas is flown) is preferably (room temperature +10° C.) and the upper limit is preferably (Tg of amorphous polyester −15° C.).

In other words, when heated to a temperature higher than this temperature range, drying efficiency decreases due to the blocking of chips, and melted chips readily occur, which in turn increases a crude by-product content to above 2 wt %. When the resulting chip after drying (final product) is formed into a subsequent article, the subsequent forming process is aggravated. When the temperature is lower than this range, the moisture content of the chip cannot be readily decreased to the desired level of not more than 300 ppm.

The amorphous polyester chip of the present invention produced in this manner, which has a sufficiently low moisture content and a sufficiently low fine particle content (and further, a sufficiently low crude by-product content), is preferably preserved in a moisture-proof container as it is, without allowing contact with outside air. The moisture-proof container is one that can suppress increase of moisture content of the chip per hour to not more than 5 ppm by housing and sealing the chip therein. As such moisture-proof container, for example, a bag (sack) made of a moisture-proof and flexible laminate consisting of polyethylene (PE) layer/aluminum (AL) layer, polyethylene (PE) layer/aluminum (AL) layer/polyethylene (PE) layer and the like are examples. As a form of the moisture-proof container, for example, a bag which is a tubular member having an inlet and an outlet on an upper part thereof and a bottom part thereof, wherein each opening is bound to seal with a string, is preferable in terms of processability. The volume is suitably about 0.5-5.0 m³.

To house a chip after a dry treatment, or a dry treatment and a fine particle removal treatment, in a moisture-proof container without allowing contact with outside air, a moisture-proof container is generally set on a chip take-out opening (outlet) of a fluidized bed type drying apparatus to house continuously discharged chips.

Figure 2:
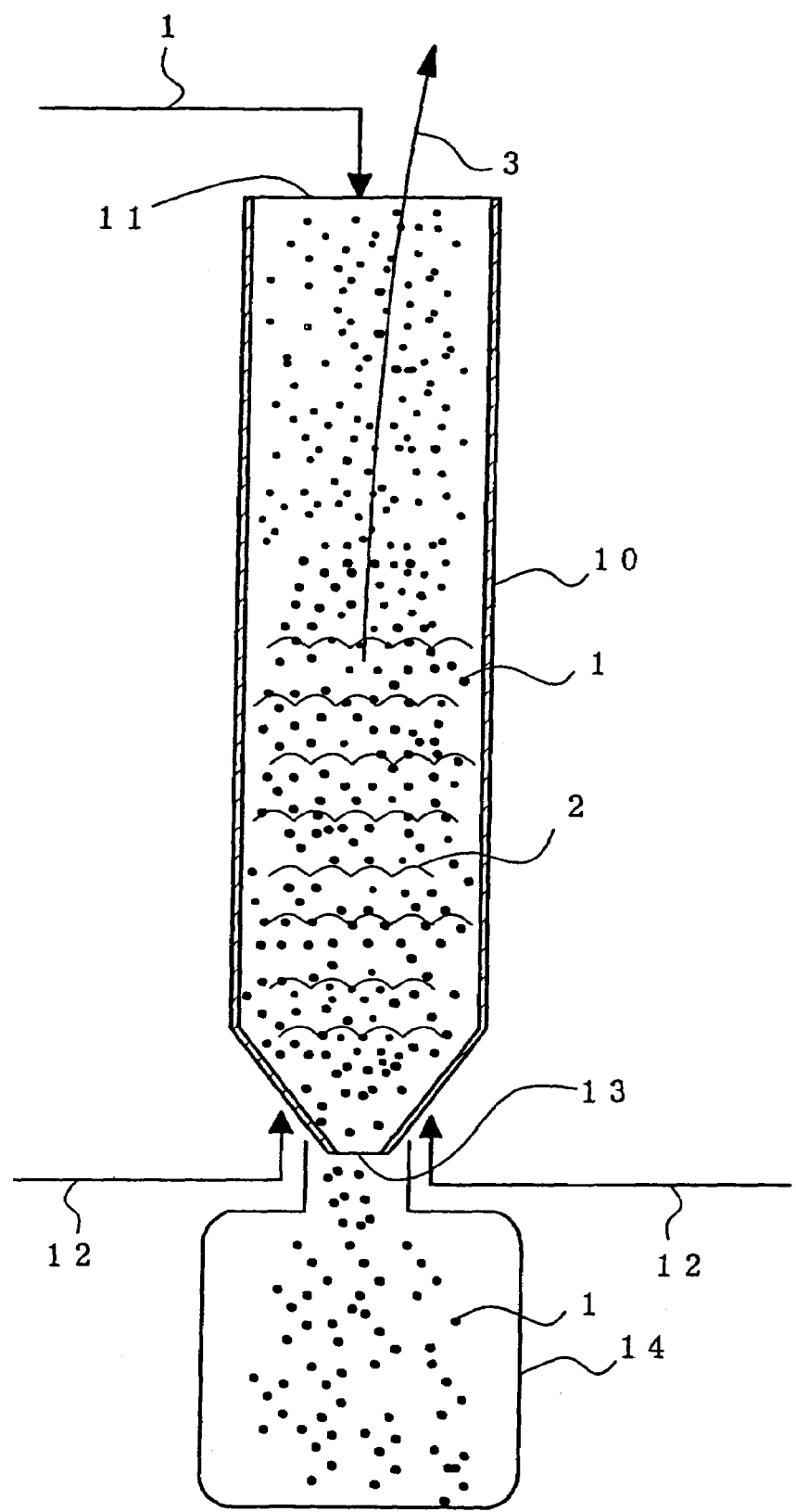
FIG. 2 is a simplified drawing showing the state where a moisture-proof container is set under a chip outlet of a silo type through-flow dryer shown in FIG. 1 and dried amorphous polyester chips are filled as they are in the moisture-proof container.

FIG. 2 shows a state where a moisture-proof container 14 is set on a chip outlet 13 of a silo type through-flow drying machine shown in FIG. 1 explained above and chips 1 sequentially dried and discharged are filled in a moisture-proof container 14 without allowing contact with outside air.

When a removal treatment of fine particles is performed in a fine particle removing apparatus, a drying apparatus and a fine particle removing apparatus are directly connected with a stainless pipe and chips are fed under a flow of dry nitrogen gas.

The above-mentioned moisture-proof container can be used as a packaging material, and the chip can be housed and shipped in a moisture-proof container. In this way, formed product makers can feed the purchased amorphous polyester chips of the present invention into a forming machine after opening the moisture-proof container without a particular dry treatment of the chips, and then perform a forming process.

Conventionally, an amorphous polyester chip is housed in, for example, a polyethylene bag (particularly free of moisture-proof structure) and shipped. It is a general practice for formed product makers to purchase amorphous polyester chips and dry them before placing them into a forming machine.

Therefore, when the amorphous polyester chip of the present invention is placed in a moisture-proof container, preserved and shipped, a drying step by formed products makers can be omitted, which increases the process efficiency. In addition, when a moisture-proof container containing dried chips is not opened and the preservation period becomes comparatively long, superior properties of the amorphous polyester chip of the present invention can be maintained without losing them.

The amorphous polyester chip of the present invention, in a copolymerized polyester chip containing a major repeating unit consisting of ethylene terephthalate, and 1,4-dimethylene-cyclohexane terephthalate or neopentyl terephthalate, an intrinsic viscosity of polyester is preferably 0.70 to 0.85 dl/g, particularly preferably 0.70 to 0.80 dl/g, in view of the mechanical strength of a subsequently formed product. To achieve the intrinsic viscosity of polyester and to maintain the thermal stability thereof, it is important to use a specific amount of at least one kind selected from an antimony compound, a germanium compound and a titanium compound as a polymerization catalyst.

As the antimony compound, antimony trioxide, antimony pentoxide, antimony trichloride, antimony acetate, antimony glycolate and the like are preferable, as the germanium compound, crystalline germanium dioxide, non-crystalline germanium dioxide, germanium tetraethoxide, germanium tetra-n-butoxide and the like are preferable, and as the titanium compound, titanium tetrabutoxide and the like are preferable.

When an antimony compound, a germanium compound or a titanium compound alone is used as a polymerization catalyst of polyester, 0.009 to 0.045 mol % of an antimony compound, 0.005 to 0.075 mol % of a germanium compound or 0.002 to 0.023 mol % of a titanium compound, relative to the polyester, is added.

In the case of an antimony compound, it is added in a proportion of preferably 0.018 to 0.035 mol %, particularly preferably 0.020 to 0.030 mol %, relative to the polyester. In the case of a germanium compound, it is added in a proportion of preferably 0.075 to 0.030 mol %, particularly preferably 0.015 to 0.025 mol %, relative to the polyester. In the case of a titanium compound, it is added in a proportion of preferably 0.002 to 0.014 mol %, particularly preferably 0.005 to 0.010 mol %, relative to the polyester.

When two or three kinds of an antimony compound, a germanium compound and a titanium compound are used in combination as a polymerization catalyst, at least one compound is added in such a manner that its content satisfies the above-mentioned lower limit and all compounds satisfy the above-mentioned upper limit.

When the contents of an antimony compound, a germanium compound and a titanium compound are all lower than the above-defined range, polyester cannot be polymerized at a sufficiently high degree (i.e., intrinsic viscosity of not less than 0.70 dl/g cannot be achieved), and the productivity decreases dramatically. When the content of any of the compounds is higher than the above-defined range, thermal decomposition of the polyester occurs during subsequent forming of the polyester chip (particularly during film forming), making stable forming unattainable, and the quality of the resulting subsequently formed products is degraded.

In the first copolymerized polyester chip comprising the major repeating unit consisting of the ethylene terephthalate, and 1,4-dimethylene-cyclohexane terephthalate or neopentyl terephthalate, it is important that melt specific resistance (hereinafter sometimes to be abbreviated as pi) of polyester at 275° C. be $0.1 \times 10^8$ to $0.75 \times 10^8$ Ω·cm (preferably $0.15 \times 10^8$ to $0.30 \times 10^8$ Ω·cm) to show fine electrostatic adhesion during subsequent film forming (manufacture of film) process by a electrostatic adhesion casting method.

That is, a polyester film is generally subsequently obtained by biaxial stretching after melt extrusion of polyester. To be specific, a sheet-like product of polyester melt extruded by an extruder is taken up in close adhesion to the surface of a rolling cooling drum, then the sheet-like product is led to a stretching roll set on a subsequent stage of a cooling drum to perform longitudinal stretching, transversely stretched on a tenter, and thermally cured (heat set) to give a polyester film.

Accordingly, to increase uniformity in the thickness of a film, and to increase a casting rate, a sheet-like product melt extruded from an extrusion spinneret needs to be closely adhered to a cooling rotating drum with a sufficiently high adhesive power. For this end, an electrostatic adhesion casting method is employed.

The electrostatic adhesion casting method comprises setting a wire electrode between an extrusion spinneret and a cooling rotating drum, applying a high voltage, allowing deposit of a static electricity on a surface of an unsolidified sheet-like product, and causing electrostatic adhesion of the sheet-like product on the surface of a cooling rotating drum. In the electrostatic adhesion casting method, for improving electrostatic adhesion of a sheet-like product to a cooling rotating drum, a charged amount on the surface of a sheet-like product needs to be increased. To achieve this, polyester should be modified to reduce its specific resistance. When the melt specific resistance of polyester of the copolymerized polyester chip is smaller than $0.1 \times 10^8$ Ω·cm, the polyester is readily charged electrostatically. When the melt specific resistance is greater than $0.75 \times 10^8$ Ω·cm, the polyester fails to show sufficient electrostatic adhesion to a cooling rotating drum during subsequent film forming, making it difficult to produce a film superior in uniformity of thickness at a high speed.

To produce a chip of a copolymerized polyester containing a major repeating unit consisting of ethylene terephthalate, and 1,4-dimethylene-cyclohexane terephthalate or neopentyl terephthalate, which is capable of subsequent high speed forming of a film having sufficiently low melt specific resistance and superior thermal stability, as well as a film superior in uniformity of thickness, specific amounts of an alkali metal compound, an alkaline earth metal compound, and a phosphorus compound are preferably contained.

As a metal of an alkali metal compound, lithium, sodium, potassium and the like are examples, and as an alkali metal compound, hydroxide, acetate, carbonate, aliphatic carboxylate, alkoxide and the like of these metals are examples. As a preferable alkali metal compound, lithium hydroxide, lithium acetate, lithium carbonate, sodium hydroxide, sodium acetate, sodium carbonate, sodium ethoxide, potassium hydroxide, potassium acetate, potassium carbonate and the like are examples. Of these, sodium acetate is most preferable. These alkali metal compounds can be used alone or used in combination of two or more kinds thereof.

As an alkaline earth metal compound, for example, (1) hydroxide of alkaline earth metal and a hydrate thereof, (2) lower aliphatic carboxylate such as acetate, propionate, butyrate and the like and a hydrate thereof, (3) aromatic carboxylate such as benzoate, 4-methylphenylcarboxylate, naphthylcarboxylate and the like and a hydrate thereof, (4) alkoxides such as methoxide, ethoxide and the like, and the like are examples. Of these, hydroxide and a hydrate thereof, acetate and a hydrate thereof are preferable. Here, as an alkaline earth metal atom, Mg, Ca, Sr, Ba and the like are examples.

Preferable specific examples of alkaline earth metal compound include calcium acetate, calcium acetate monohydrate, magnesium acetate, magnesium acetate 4 hydrate and barium acetate. Of these, calcium acetate monohydrate and magnesium acetate 4 hydrate are particularly preferable.

As the phosphorus compound, for example, phosphoric acid, phosphorous acid, phosphonic acid and derivatives thereof and the like are examples. Preferable specific examples include phosphoric acid, trimethyl phosphate, tributyl phosphate, triphenyl phosphate, monomethyl phosphate, dimethyl phosphate, monobutyl phosphate, dibutyl phosphate, phosphorous acid, trimethyl phosphite, tributyl phosphite, methylphosphonic acid, dimethyl methylphosphonate, dimethyl ethylphosphonate, dimethyl phenylphosphonate, diethyl phenylphosphonate and diphenyl phenylphosphonate. Of these, trimethyl phosphate and phosphoric acid are particularly preferable.

In the case of the first copolymerized polyester chip comprising ethylene terephthalate and 1,4-dimethylene-cyclohexane terephthalate as major repeating units, it is critical to contain an alkali metal compound, an alkaline earth metal compound and a phosphorus compound in proportions satisfying the following formulas (I)-(IV) relative to the copolymerized polyester:

$$0.005 \leq M1 (\text{mol \%}) \leq 0.029 \quad (I)$$

$$0.045 \leq M2 (\text{mol \%}) \leq 0.225 \quad (II)$$

$$1.67 \leq M2/M1 (\text{molar ratio}) \leq 45 \quad (III)$$

$$0.50 \leq (M1+M2)/P (\text{molar ratio}) \leq 3.00 \quad (IV)$$

In the formula (I) to the formula (IV), M1 is a content (mol %) of alkali metal compound relative to polyester, M2 is a content (mol %) of alkaline earth metal compound relative to polyester and P is a content (mol %) of phosphorus compound relative to polyester.

When M2/M1 does not satisfy the formula (III), the ρi value does not fall within the range defined above, thus failing to achieve fine electrostatic adhesion to a cooling rotating drum during subsequent film forming, which in turn makes it difficult to produce a film superior in uniformity of thickness at a high speed. The M2/M$^1$ is preferably within the range of not less than 5 and not more than 20.

When (M1+M2)/P does not satisfy the formula (IV), the ρi value does not fall within the range defined above, thus failing to achieve fine electrostatic adhesion to a cooling rotating drum during subsequent film forming, which in turn makes it difficult to produce a film superior in uniformity of thickness at a high speed or results in lower thermal stability. The (M1+M2)/P is particularly preferably within the range of not less than 1.5 and not more than 4.0.

The content (M1) of alkali metal compound relative to polyester is preferably 0.005 to 0.029 mol %, particularly preferably 0.010 to 0.020 mol %. When the alkali metal compound is less than 0.005 mol % relative to polyester, the ρi value becomes high, thus failing to achieve sufficient electrostatic adhesion to a cooling rotating drum during subsequent film forming, which in turn makes it difficult to produce a film superior in uniformity of thickness at a high speed. When it exceeds 0.029 mol %, thermal stability is degraded.

The content (M2) of alkaline earth metal compound relative to polyester is preferably 0.045 to 0.225 mol %, particularly preferably 0.063 to 0.117 mol %. When the alkaline earth metal compound is less than 0.045 mol % relative to polyester, the ρi value becomes high, thus failing to achieve sufficient electrostatic adhesion to a cooling rotating drum during subsequent film forming, which in turn makes it difficult to produce a film superior in uniformity of thickness at a high speed. When it exceeds 0.225 mol %, thermal stability is degraded.

On the other hand, in the case of the second copolymerized polyester chip comprising ethylene terephthalate and neopentyl terephthalate as major repeating units, it is critical to contain an alkali metal compound, an alkaline earth metal compound and a phosphorus compound in proportions satisfying the following formulas (V) to (VII) relative to the polyester, to achieve superior electrostatic adhesion and to reduce foreign substances:

$$0.005 \leq M1 (\text{mol \%}) \leq 0.050 \quad \text{(V)}$$

$$0.05 \leq M2 (\text{mol \%}) \leq 0.40 \quad \text{(VI)}$$

$$1.0 \leq M2/P (\text{molar ratio}) \leq 3.5 \quad \text{(VII)}$$

In the formula (V) to the formula (VII), M1, M2 and P are as defined above.

That is, the content (M2) of alkaline earth metal compound relative to polyester is preferably 0.05 to 0.40 mol %, the lower limit is more preferably 0.07 mol % and particularly preferably 0.10 mol %. When the alkaline earth metal compound is less than 0.05 mol % relative to polyester, the "specific resistance (ρi value) when melted at 275° C.", which is an alternative characteristic of electrostatic adhesion of polyester cannot be made sufficiently small. The upper limit thereof is more preferably 0.30 mol %, particularly preferably 0.20 mol %. When the alkaline earth metal compound exceeds 0.40 mol % relative to polyester, the polyester becomes insufficient from the aspects of foreign substance and color tone, such as an increase in yellow color due to a high color b value of copolymerized polyester, an increase in the amount of foreign substance in the copolymerized polyester, etc.

The content (P) of the phosphorus compound is preferably determined depending on the content of alkaline earth metal compound. The molar ratio (M2/P) of the content (M2) of alkaline earth metal compound and content (P) of phosphorus compound relative to polyester is preferably 1.0 to 3.5 and the lower limit is more preferably 1.2, particularly preferably 1.5. When the aforementioned molar ratio (M2/P) is less than 1.0, the ρi value cannot be made sufficiently small and sufficient electrostatic adhesion cannot be obtained.

On the other hand, the upper limit of the aforementioned molar ratio (M2/P) is more preferably 3.0 and particularly preferably 2.5. When the aforementioned molar ratio (M2/P) exceeds 3.5, a free alkaline earth metal compound contained in the polyester increases. As a result, the quality of polyester is degraded as evidenced by an increase in the yellow color due to a high color b value of copolymerized polyester, lower heat resistance, an increase in the amount of foreign substance, etc.

The content (M1) of alkali metal compound relative to polyester is preferably 0.005 to 0.050 mol %, the lower limit is particularly preferably 0.008 mol % and the upper limit is particularly preferably 0.035 mol %. When the alkali metal compound is less than 0.005 mol % relative to polyester, an electrostatic adhesion-improving effect becomes small and when it exceeds 0.050 mol %, an electrostatic adhesion-improving effect reaches a maximum and a foreign substance due to excess alkali metal compounds occurs.

To achieve both transparency and solvent adhesiveness of polyester in the present invention, moreover, the glycol component preferably has a particular composition consisting of 50 to 85 mol % of ethylene glycol, 12 to 45 mol % of 1,4-cyclohexanedimethanol or neopentyl glycol, and 1.5 to 7 mol % (preferably 2.5 to 5.0 mol %) of diethylene glycol.

To obtain such a copolymerized polyester chip, it is essential to use diethylene glycol as a part of a starting material monomer, where the use of diethylene glycol in a proportion of 0.5 to 6.5 mol % relative to the entire glycol is preferable. When the amount of diethylene glycol in the starting material monomer is less than 0.5 mol % relative to the entire glycol, a polyester having a diethylene glycol component of not less than 1.5 mol % relative to the entire glycol component is difficult to produce. In contrast, when the amount of diethylene glycol in a starting material monomer relative to the entire glycol exceeds 6.5 mol %, the amount of diethylene glycol component relative to the entire glycol component exceeds 7.0 mol %.

The copolymerized polyester of the present invention can be produced using a batch type reaction apparatus (batch polymerization method) or a continuous type reaction apparatus (continuous polymerization method). For example, when 20 ton is produced by continuous operation using a continuous type reaction apparatus (continuous polymerization method), the range of variation (difference between maximum value and minimum value) of intrinsic viscosity (degree of polymerization) can be controlled to not more than 0.050 dl/g, preferably not more than 0.025 dl/g. In addition, the range of variation (difference between maximum value and minimum value) of the amount of the diethylene glycol component (copolymerization amount) can be controlled to not more than 0.5 mol %, preferably not more than 0.3 mol %.

In a continuous type reaction apparatus (continuous polymerization method), an esterification reaction (transesterification reaction) and a melt polycondensation reaction may be each carried out in one step but preferably carried out in plural steps. In addition, when an esterification reaction (transesterification reaction) is carried out in plural steps, the number of reactors is preferably 2 or 3. When melt polycondensation is conducted in plural steps, the number of reactors is preferably 3 to 7. Furthermore, the temperature of esterification reaction (transesterification reaction) in continuous polymerization method is generally 240-270° C., preferably 250-265° C. In addition, the pressure in the reactor is generally not more than 0.2 MPa, preferably 0.01-0.05 MPa. The temperature of the polycondensation reaction is generally 265-285° C., preferably 270-280° C., and the pressure in the reactor is generally not more than 1.5 hPa, preferably not more than 0.5 hPa. The reaction time of the esterification reaction (transesterification reaction) is preferably not more than 5 hours, particularly preferably 2 to 3.5 hours. The reaction time of the polycondensation reaction is preferably not more than 3 hours, particularly preferably 1 to 2 hours.

In the case of production using a batch type reaction apparatus (batch polymerization method), the obtained polymer should be extracted from a polymerization reactor while maintaining the internal pressure of a polymerization reactor at 0.1 to 300 hPa, preferably 5 to 50 hPa. This suppresses variation in the intrinsic viscosity (degree of polymerization) of polymer (copolymerized polyester) in an extraction process. When, for example, polyester (700 kg) is to be produced and the extraction time is 30 min, the range of variation (difference between maximum value and minimum value) in the intrinsic viscosity can be controlled to not more than 0.050 dl/g, preferably not more than 0.025 dl/g.

In the production of polyester in a conventional general batch type reaction apparatus (batch polymerization method), extraction of polymer from a polymerization reactor is performed while making the inside of the polymerization reactor pressurized with a nitrogen gas and the like. However, in such a conventional method, the range of variation (difference between maximum value and minimum value) of intrinsic viscosity of a polymer (copolymerized polyester) is not less than 0.1 dl/g.

When a method is performed for extracting a polymer from a polymerization reactor, whose internal pressure is maintained at reduced pressure, a means such as a gear pump and the like is preferably set beforehand on an extraction opening of a polymerization reactor. Without such a gear pump means, a polymer cannot be extracted efficiently from a reactor with reduced pressure.

The temperature of an esterification reaction (transesterification reaction) by a batch polymerization method is generally 220-250° C., preferably 230 to 245° C. In addition, the pressure in the reactor is generally 0.2 to 0.4 MPa, preferably 0.25 to 0.30 MPa. The polycondensation reaction may be done in one step or divided into plural steps. When it is done in one step, the pressure is gradually reduced and the temperature is gradually increased, to a final temperature of 260 to 280° C., preferably 265 to 275° C., and a final pressure of generally not more than 3 hPa, preferably not more than 0.5 hPa. The reaction time of the esterification reaction or transesterification reaction is preferably not more than 4 hours, particularly preferably 2 to 3 hours. The reaction time of polycondensation reaction is preferably not more than 5 hours, particularly preferably 2 to 4 hours.

In the case of a direct esterification method, the aforementioned polymerization catalyst can be added before start of the esterification reaction, or at any time of after the completion of the pressurization esterification reaction up to the start of the initial polycondensation reaction. When an antimony compound or a titanium compound is used as a polymerization catalyst, however, it is preferably added before esterification reaction.

In the amorphous polyester chip of the present invention, inert particles such as titanium oxide, silica, calcium carbonate and the like, pigment, heat stabilizer, antioxidant, mold release agent, UV absorbent, coloring agent and the like may be added as necessary in a polymerization reaction process of polyester as long as the object of the present invention is not impaired. Other polymerization catalyst, thermal stabilizer and additive are preferably added after esterification reaction.

In the case of a transesterification method, the aforementioned polymerization catalyst may be added at any time between before start of transesterification reaction and before start of the initial polycondensation reaction. However, since a titanium compound functions not only as a polymerization catalyst but also as a transesterification catalyst, it is preferably added before the start of the transesterification reaction. Other polymerization catalyst, thermal stabilizer and additive are preferably added after completion of transesterification reaction. A transesterification catalyst needs to be added before the start of the transesterification reaction.

In the case of a transesterification method, it is necessary to add a transesterification catalyst besides one or more kinds of the above-mentioned antimony compound, germanium compound and titanium compound. As such a transesterification catalyst, a manganese compound, a zinc compound and the like are preferable, and they may be preferably contained in a proportion of 0.01 to 0.05 mol %, more preferably 0.015 to 0.035 mol %, particularly preferably 0.02 to 0.03 mol %, relative to copolymerized polyester.

As used herein, the zinc compound includes, for example, organic acid salts such as zinc acetate, zinc benzoate and the like; chlorides such as zinc chloride and the like, alkoxides such as zinc methoxide and the like; zinc acetylacetonate and the like. Of these, zinc acetate is preferable. As the manganese compound, for example, organic acid salts such as manganese acetate, manganese benzoate and the like, chlorides such as manganese chloride and the like, alkoxides such as manganese methoxide and the like, manganese acetylacetonate and the like are examples. Of these, manganese acetate is preferable.

The amorphous polyester chip of the present invention can be preferably used as a starting material for subsequently forming articles such as film, sheet, hollow formed container, fiber, bottle, engineering plastic and the like. Particularly, it is preferable as a starting material of a heat shrinkable film used for labels to cover an outer periphery of various articles, material for packaging, binding and the like of various articles, and the like. The amorphous polyester chip of the present invention characteristically shows sufficiently low moisture content and low amount of fine particles. Therefore, subsequently formed products obtained from the chips show reduced frequency of decrease of molecular weight and associated changes in composition in the forming process, which in turn makes it possible to obtain a high quality subsequently formed product superior in mechanical strength and uniformity of composition.

Particularly, when two or more kinds of chips having different copolymerization compositions are mixed and a subsequently formed product is produced from the mixture of the chips, and when resin chips other than the amorphous polyester chip of the present invention (e.g., crystalline polyester chip such as polyethylene terephthalate, polybutylene terephthalate and the like, polycarbonate chip, crystalline copolymerized polyester chip obtained by copolymerization of polyethylene terephthalate, polybutylene terephthalate and the like with other acid component and/or a glycol component, etc.) are mixed and a subsequently formed product is produced therefrom, a high quality formed product particularly superior in uniformity of composition can be produced.

The amorphous polyester chip of the present invention can result in a high quality subsequently formed product superior in mechanical strength and uniformity of composition, and having high transparency as compared to PET. However, the amorphous polyester chip of the present invention tends to be darkened or yellowed, thus posing a problematic aspect to be improved in terms of color tone. An amorphous polyester chip improved in color tone, which achieved clear transparency, is explained in the following.

For a copolymerized polyester (first copolymerized polyester) chip comprising ethylene terephthalate and 1,4-dimethylene-cyclohexane terephthalate as major ester units to improve color tone and achieve clear transparency, it is necessary that its color L value be 45 to 70 and its color b value be −3 to 5, and depending on the polymerization catalyst (metal compound) to be used, a particularly preferable embodiment of polyester exists. To be specific, the following 4 embodiments (polyesters A-D) are presented.

The color L value and color b value are measured by a calorimeter according to JIS Z 8722, wherein color L value is a scale value showing lightness in color tone, with a higher value meaning less darkening and higher lightness, and the color b value is a scale value showing yellowness, with a higher value meaning high yellowness and a larger minus value means stronger blue color.

[Copolymerized Polyester A]

Copolymerized polyester A is a copolymerized polyester chip obtained using an antimony compound as a polymerization catalyst, which contains an alkaline earth metal compound and a phosphorus compound, has a color L value of 45-65 and a color b value of −3 to 5.

In other words, when an antimony compound is used as a polymerization catalyst, the color tone of the copolymerized polyester should have a color L value of 45 to 65 and a color b value of −3 to 5 to achieve clear transparency of a copolymerized polyester. When the color b value exceeds 5, yellow color of polymer becomes deep and when the color b value becomes greater in negative than −3, blue color becomes noticeable. When the color L value is less than 45, polymer is readily darkened. When the color b value is in the range of −3 to 5 and the color L value exceeds 65, it would not cause a problem in terms of color tone, but when an antimony compound is used as a polymerization catalyst, a color L value exceeding 65 at an industrial scale is practically difficult to achieve.

The copolymerized polyester A is achieved by the addition of specific amounts of an alkaline earth metal compound and a phosphorus compound in a production process of a copolymerized polyester using an antimony compound as a polymerization catalyst.

The amount of the terephthalic acid component is preferably not less than 70 mol %, particularly preferably not less than 85 mol %, specifically preferably not less than 95 mol % and most preferably 100 mol %, relative to the entire dicarboxylic acid component. The dicarboxylic acid component other than the terephthalic acid component is the same as the dicarboxylic acid component other than the terephthalic acid component explained above.

The glycol component preferably consists of ethylene glycol (EG)/1,4-cyclohexanedimethanol (CHDM), wherein preferably EG/CHDM=20 to 80/80 to 20 (mol %), more preferably 20 to 40/60-80 (mol %) or 60 to 80/20 to 40 (mol %), particularly preferably 25 to 35/65 to 75 (mol %) or 65 to 75/25 to 35 (mol %).

Other glycol components besides EG and CHDM may be used in a proportion of less than 10 mol % of the entire glycol component. In this case, other glycol components besides EG and CHDM are as mentioned above.

The antimony compound to be used as a polymerization catalyst is preferably added in a proportion of 0.009 to 0.045 mol % relative to the polyester. When the content of the antimony compound is less than 0.009 mol %, polymerization activity during polyester production tends to be insufficient. When formed products such as film, sheet, engineering plastic and the like are produced from a copolymerized polyester chip having a degree of polymerization not sufficiently high (e.g., intrinsic viscosity of less than 0.60 dl/g), therefore, the mechanical properties of the subsequently formed products are degraded. In addition, the polymerization time to achieve a sufficiently high intrinsic viscosity (generally 0.60 to 0.90 dl/g) of a copolymerized polyester becomes longer, markedly decreasing the productivity thereof. On the other hand, when the content of the antimony compound exceeds 0.045 mol %, thermal decomposition of a copolymerized polyester becomes intense when the copolymerized polyester is formed, making stable forming difficult to achieve, which in turn may result in degraded quality of subsequently formed products. In addition, the copolymerized polyester is frequently darkened and the color L value may decrease.

As a polymerization catalyst, an antimony compound and other polymerization catalysts may be used alongside, and as such polymerization catalyst, a germanium compound and a titanium compound are examples. While the content of the germanium compound varies depending on the content of the antimony compound to be used, 0.003 to 0.0075 mol % is preferable. While the content of the titanium compound varies depending on the content of the antimony compound to be used, 0.0001 to 0.002 mol % relative to polyester is preferable.

The amount of the alkaline earth metal compound to be added during production process of a copolymerized polyester is preferably 0.001 to 0.040 mol % relative to the copolymerized polyester, wherein the lower limit thereof is more preferably 0.005 mol %, particularly preferably 0.010 mol %. The upper limit thereof is more preferably 0.025 mol %, particularly preferably 0.020 mol %. When the content of the alkaline earth metal compound is less than 0.001 mol % relative to the copolymerized polyester, the color L value (lightness) of the copolymerized polyester does not become high, and darkening of the copolymerized polyester cannot be sufficiently removed, and color tone becomes insufficient. On the other hand, when the content of the alkaline earth metal compound exceeds 0.040 mol %, color b value of the copolymerized polyester becomes high, the copolymerized polyester becomes more yellow and the color tone becomes insufficient.

The content of the phosphorus compound is determined based on the content of the alkaline earth metal compound, and the amounts that make the molar ratio (M/P) of the content (M) of the alkaline earth metal compound and the content (P) of the phosphorus compound fall under the range of 0.2 to 3.5 are preferable. The lower limit of the molar ratio (M/P) is more preferably 0.75, particularly preferably 0.8, and the upper limit is more preferably 1.75, particularly preferably 1.2. The amount that makes the molar ratio (M/P) less than 0.2 causes easy generation of a by-product in polyester, and tends to degrade the heat resistance of the copolymerized polyester. The amount that makes (M/P) more than 3.5 increases a free alkaline earth metal compound, which in turn results in degraded quality as evidenced by increase in the color b value of copolymerized polyester which increases a yellow color, degraded heat resistance, or decrease in color L value which lowers transparency, and the like.

To further improve the color tone of a polymer, a cobalt compound may be added, wherein the content of the cobalt compound is preferably 0 to 0.02 mol % relative to copolymerized polyester.

In the copolymerized polyester A, an alkaline earth metal and a phosphorus compound can be added in any of an esterification step, an initial polymerization step and a late polymerization step during the production of a copolymerized polyester. Particularly, it is preferably added after an esterification step is completed, and when a terminal carboxyl group concentration (AVo) of oligomer is 0-700 eq/ton, more preferably 0 to 500 eq/ton, and particularly preferably 0-350 eq/ton. Particularly, if an alkaline earth metal compound is added to the reaction system when terminal carboxyl group concentration (AVo) of oligomer has exceeded 700 eq/ton, a reaction product of the alkaline earth metal compound and the terephthalic acid precipitate, and transparency of the copolymerized polyester is readily impaired.

An antimony compound, which is a polymerization catalyst, can be added in any of an esterification step, an initial polymerization step and a late polymerization step, but it is preferably added after esterification reaction. A titanium catalyst is preferably added before the esterification reaction.

[Copolymerized Polyester B]

Copolymerized polyester B is a copolymerized polyester chip obtained using a germanium compound as a catalyst, which contains an alkaline earth metal compound and a phosphorus compound, has a color L value of 60 to 70 and a color b value of −3 to 5.

In other words, when a germanium compound is used as a polymerization catalyst, the color tone of the copolymerized polyester should show a color L value of 60 to 70 and a color b value of −3 to 5 to achieve clear transparency of a copolymerized polyester. When the color b value exceeds 5, yellow color of polymer becomes deep and when the color b value becomes greater in negative than −3, blue color becomes noticeable. When the color L value is less than 60, the polymer cannot be used for an application (e.g., handle of tooth brush etc.) that requires extremely highly clear transparency. When the color b value is in the range of −3 to 5 and the color L value exceeds 70, it would not cause a problem in terms of color tone, but when a germanium compound is used as a polymerization catalyst, a color L value exceeding 70 at an industrial scale is practically difficult to achieve.

The copolymerized polyester B is achieved by the addition of specific amounts of an alkaline earth metal compound and a phosphorus compound in a production process of a copolymerized polyester using a germanium compound as a polymerization catalyst.

A preferable composition of the glycol component is the same as the aforementioned copolymerized polyester A.

Other glycol components besides EG and CHDM may be used in a proportion of less than 10 mol % of the entire glycol component. In this case, other glycol components besides EG and CHDM are as mentioned above.

The germanium compound to be used as a polymerization catalyst is preferably added in a proportion of 0.0075 to 0.045 mol % relative to the copolymerized polyester. When the content of the germanium compound is less than 0.0075 mol %, polymerization activity during polyester production tends to be insufficient. When formed products such as film, sheet, engineering plastic and the like are produced from a copolymerized polyester having a degree of polymerization not sufficiently high (e.g., intrinsic viscosity of less than 0.60 dl/g), therefore, the mechanical properties of the obtained formed products are degraded. In addition, the polymerization time to achieve a sufficiently high intrinsic viscosity (generally 0.60 to 0.90 dl/g) of a copolymerized polyester becomes longer, markedly decreasing the productivity. On the other hand, when the content of the germanium compound exceeds 0.045 mol %, thermal decomposition of a copolymerized polyester becomes intense when the copolymerized polyester is formed, making stable forming difficult to achieve, which in turn may result in degraded quality of formed products. In addition, the copolymerized polyester frequently becomes yellowish and the color b value increases.

As a polymerization catalyst, a germanium compound and other polymerization catalysts may be used alongside, and as such polymerization catalyst, an antimony compound and a titanium compound are examples. While the content of the antimony compound varies depending on the content of the germanium compound to be used, 0.0045 to 0.0090 mol % is preferable. While the content of the titanium compound varies depending on the content of the antimony compound to be used, 0.0001 to 0.002 mol % relative to a copolymerized polyester is preferable.

A preferable amount of an alkaline earth metal compound to be added in the production process of the copolymerized polyester is the same amount for the same reasons for the aforementioned copolymerized polyester A.

The content of the phosphorus compound is determined based on the total of the contents of the alkaline earth metal compound and germanium compound, and the amounts that make the molar ratio ((M+Ge)/P) of the total of the contents of the alkaline earth metal compound (M) and germanium compound (Ge) to the content of the phosphorus compound (P) fall under the range of 0.2 to 3.5 are preferable. The lower limit of the molar ratio ((M+Ge)/P) is more preferably 0.75, particularly preferably 0.8, and the upper limit is more preferably 1.75, particularly preferably 1.2. The amount that makes the molar ratio ((M+Ge)/P) less than 0.2 causes easy generation of a by-product in polyester, and tends to degrade the heat resistance of the copolymerized polyester. The amount that makes ((M+Ge)/P) more than 3.5 increases a free alkaline earth metal compound and germanium compound, which in turn results in degraded quality as evidenced by increase in the color b value of copolymerized polyester, which increases a yellow color, degraded heat resistance, or decrease in color L value, which lowers transparency, and the like.

To further improve the color tone of a polymer, a cobalt compound may be added, wherein the content of the cobalt compound is the same as that of the aforementioned copolymerized polyester A.

In the copolymerized polyester, an alkaline earth metal and a phosphorus compound can be added in any of an esterification step, an initial polymerization step and a late polymerization step during the production of a copolymerized polyester. Particularly, like the aforementioned copolymerized polyester A, it is preferable to add after completion of the esterification step, when an oligomer has a particular terminal carboxyl group concentration (AVo), wherein the terminal carboxyl group concentration (AVo) of oligomer that specifies such time of addition is the same as in the aforementioned copolymerized polyester A.

A germanium compound, which is a polymerization catalyst, can be added in any of an esterification step, an initial polymerization step and a late polymerization step, but it is preferably added before esterification reaction. Even when a germanium compound and a catalyst other than the germanium compound are used concurrently, they are all preferably added before the esterification reaction.

[Copolymerized Polyester C]

It is a copolymerized polyester chip obtained using a titanium compound as a catalyst, which contains an alkaline earth metal compound, a phosphorus compound and a cobalt compound, and which has a color L value of 50 to 65 and a color b value of −3 to 5. It is possible to use an organic toner instead of the cobalt compound.

In other words, when a titanium compound is used as a polymerization catalyst, the color tone of the copolymerized polyester should show a color L value of 50 to 65 and a color b value of −3 to 5 to achieve clear transparency of a copolymerized polyester. When the color b value exceeds 5, yellow color of polymer becomes deep and when the color b value becomes greater in negative than −3, blue color becomes noticeable. When the color L value is less than 50, polymer is readily darkened and clear transparency is difficult to obtain. When the color b value is in the range of −3 to 5 and the color L value exceeds 65, it would not cause a problem in terms of color tone, but when a titanium compound is used as a polymerization catalyst, a color L value exceeding 65 at an industrial scale is practically difficult to achieve.

The copolymerized polyester C is achieved by the addition of specific amounts of an alkaline earth metal compound, a phosphorus compound and a cobalt compound (or an organic toner) in a production process of a copolymerized polyester using a titanium compound as a polymerization catalyst.

A preferable composition of the glycol component is the same as the aforementioned copolymerized polyester A.

Other glycol components besides EG and CHDM may be used in a proportion of less than 10 mol % of the entire glycol component. In this case, other glycol components besides EG and CHDM are as mentioned above.

The titanium compound to be used as a polymerization catalyst is preferably added in a proportion of 0.002 to 0.015 mol % relative to the copolymerized polyester. When the content of the titanium compound is less than 0.002 mol %, polymerization activity during production of copolymerized polyester tends to be insufficient. When subsequently formed products such as film, sheet, engineering plastic and the like are produced from a copolymerized polyester having a degree of polymerization not sufficiently high (e.g., intrinsic viscosity of less than 0.60 dl/g), therefore, the mechanical properties of the subsequently formed products are degraded. In addition, the polymerization time to achieve a sufficiently high intrinsic viscosity (generally 0.60 to 0.90 dl/g) of a copolymerized polyester becomes longer, markedly decreasing the productivity. On the other hand, when the content of the titanium compound exceeds 0.015 mol %, thermal decomposition of a copolymerized polyester becomes intense when the copolymerized polyester is formed, making stable forming difficult to achieve, which in turn may result in degraded quality of subsequently formed products. In addition, the copolymerized polyester frequently becomes yellowed and the color b value may increase.

As a polymerization catalyst, a titanium compound and other polymerization catalysts may be used alongside, and as such polymerization catalyst, an antimony compound and a germanium compound are examples. While the content of the antimony compound varies depending on the content of the titanium compound to be used, 0.0035 to 0.0090 mol % is preferable. While the content of the germanium compound varies depending on the content of the titanium compound to be used, 0.0003 to 0.0075 mol % relative to a copolymerized polyester is preferable.

A preferable amount of an alkaline earth metal compound to be added in the production process of the copolymerized polyester is the same amount for the same reasons for the aforementioned copolymerized polyester A. In addition, the content of the phosphorus compound is also the same amount for the same reasons for the aforementioned copolymerized polyester A.

To further improve the color tone of a polymer, it is important to add a cobalt compound or an organic toner, wherein the content of the cobalt compound is preferably 0.005 to 0.025 mol %, more preferably 0.005 to 0.020 mol % and particularly preferably 0.005 to 0.015 mol %, relative to copolymerized polyester. When the content of the cobalt compound is less than 0.005 mol %, the color b value of the resulting copolymerized polyester becomes high and the yellow color of the polymer cannot be eliminated sufficiently, whereas when the content of the cobalt compound exceeds 0.015 mol %, the obtained copolymerized polyester is darkened due to the cobalt compound and the color L value decreases. As the organic toner, anthraquinone toner, quinacridone toner, diketopyrrolochlor toner, perinone toner, condensed azo toner and the like are examples. Of these, anthraquinone toner is preferable. The aforementioned organic toner is preferably contained in a proportion of 0.01 to 5 ppm relative to the copolymerized polyester produced.

In the copolymerized polyester, an alkaline earth metal, a phosphorus compound and a cobalt compound (or organic toner) can be added in any of an esterification step, an initial polymerization step and a late polymerization step during the production of a copolymerized polyester. Particularly, like the time of addition of an alkaline earth metal and a phosphorus compound in the aforementioned copolymerized polyester A, it is preferable to add after completion of the esterification step, when an oligomer has a particular terminal carboxyl group concentration (AVo), wherein the terminal carboxyl group concentration (AVo) of oligomer that specifies such time of addition is the same as in the aforementioned copolymerized polyester A.

A titanium compound, which is a polymerization catalyst, is preferably added before esterification reaction and other catalysts and additives can be added in any of an esterification step, an initial polymerization step and a late polymerization step, but they are all preferably added after esterification reaction.

[Copolymerized Polyester D]

It is a copolymerized polyester obtained using an antimony compound as a catalyst, which contains a zinc compound and/or a manganese compound and a phosphorus compound, and is a copolymerized polyester chip having a color L value of 45 to 65 and a color b value of −3 to 5.

In other words, when an antimony compound is used as a polymerization catalyst, the color tone of the copolymerized polyester should have a color L value of 45-65 and a color b value of −3 to 5 to achieve clear transparency of a copolymerized polyester. When the color b value exceeds 5, yellowish color of polymer becomes deep and when the color b value becomes greater in negative than −3, blue color becomes noticeable. When the color L value is less than 45, polymer is easily darkened and clear transparency is difficult to obtain. When the color b value is in the range of −3 to 5 and the color L value exceeds 65, it would not cause a problem in terms of color tone, but when a antimony compound is used as a polymerization catalyst, a color L value exceeding 65 at an industrial scale is practically difficult to achieve.

The copolymerized polyester D is achieved by the addition of specific amounts of a zinc compound and/or a manganese compound and a phosphorus compound in a production process of a copolymerized polyester using an antimony compound as a polymerization catalyst.

A preferable composition of the glycol component is the same as the aforementioned copolymerized polyester A.

Glycol components other than EG and CHDM may be used in a proportion of less than 10 mol % of the entire glycol component. In this case, glycol components other than EG and CHDM are as mentioned above.

The content of the antimony compound to be used as a polymerization catalyst is preferably the same amount as that of the aforementioned copolymerized polyester A for the same reasons.

Either or both of the zinc compound and the manganese compound is (are) added in the production process of the copolymerized polyester. The total content (M) relative to the copolymerized polyester is preferably 0.001 to 0.040 mol % relative to the copolymerized polyester, where the lower limit of the total content (M) is more preferably 0.005 mol %, particularly preferably 0.010 mol %. The upper limit of the total content (M) is more preferably 0.025 mol %, particularly preferably 0.020 mol %. As used herein, by the total content (M) is meant the content of zinc compound when zinc compound alone is used, the content of manganese compound when manganese compound alone is used, and the total of the contents of zinc compound and manganese compound when both the zinc compound and manganese compound are used.

When the total content (M) is less than 0.001 mol % relative to the copolymerized polyester, the color L value (lightness) of the copolymerized polyester does not become high, and darkening of the copolymerized polyester cannot be sufficiently removed, and color tone becomes insufficient. On the other hand, when the total content (M) exceeds 0.040 mol %, color b value of the copolymerized polyester becomes high, the copolymerized polyester becomes more yellow and the color tone becomes insufficient.

The content of the phosphorus compound is determined based on the total content (M) of a zinc compound and a manganese compound, and the amounts that make the molar ratio (M/P) of the total content (M) and the content of the phosphorus compound (P) fall under the range of 0.2 to 3.5 are preferable. The lower limit of the molar ratio (M/P) is more preferably 0.75, particularly preferably 0.8, and the upper limit is more preferably 1.75, particularly preferably 1.2. The amount that makes the molar ratio (M/P) less than 0.2 causes easy generation of a by-product in polyester, and tends to degrade the heat resistance of the copolymerized polyester. The amount that makes ((M+Ge)/P) more than 3.5 increases a free zinc compound and/or a manganese compound, which in turn degrades quality as evidenced by increase in the color b value of copolymerized polyester to increase a yellow color, degraded heat resistance, or decrease in color L value to lower transparency and the like.

To further improve the color tone of a polymer, it is important to add a cobalt compound, wherein the content of the cobalt compound is preferably 0.005 to 0.025 mol %, more preferably 0.005 to 0.020 mol % and particularly preferably 0.005 to 0.015 mol %, relative to copolymerized polyester. When the content of the cobalt compound is less than 0.005 mol %, a color tone improvement effect is difficult to obtain, whereas when the content of the cobalt compound exceeds 0.025 mol %, the obtained copolymerized polyester is unpreferably darkened due to the cobalt compound.

To further improve the color tone of a polymer, an alkaline earth metal compound may be added. As the alkaline earth metal compound, those exemplified for the aforementioned alkaline earth metal compound can be used. The alkaline earth metal compound is preferably added in a proportion of 0.001 to 0.040 mol % relative to the copolymerized polyester.

In the copolymerized polyester, the zinc compound and/or manganese compound, and phosphorus compound may be added in any of an esterification step, an initial polymerization step and a late polymerization step, but they are preferably added before esterification reaction, and the phosphorus compound is preferably added after esterification reaction.

A titanium compound, which is a polymerization catalyst, is preferably added before esterification reaction and other catalysts and additives can be added in any of an esterification step, an initial polymerization step and a late polymerization step, but they are all preferably added after esterification reaction.

The foregoing copolymerized polyesters A to D aim at improvement of color tone of chip of copolymerized polyester (first copolymerized polyester) comprising ethylene terephthalate and 1,4-dimethylene-cyclohexane terephthalate as major ester units. In a chip of copolymerized polyester (second copolymerized polyester) comprising ethylene terephthalate and neopentyl terephthalate as major ester units, it is important that its color L value be 50-60 and the color b value be −5.0 to 5.0, where a preferable embodiment of polyester is present depending on the polymerization catalyst (metal compound) to be used. Specifically, the following two embodiments (polyesters E, F) are examples.

[Copolymerized Polyester E]

It is a copolymerized polyester obtained using a titanium compound and a germanium compound as catalysts, which contains a cobalt compound and a phosphorus compound, and which is a copolymerized polyester chip having a color L value of 50 to 60 and a color b value of −5.0 to 5.0.

In other words, when a copolymerized polyester containing ethylene terephthalate and neopentyl terephthalate as major repeating units is produced using a titanium compound and a germanium compound as polymerization catalysts, the color tone of the copolymerized polyester should have a color L value of 50 to 60 and a color b value of −5.0 to 5.0 to achieve clear transparency of the copolymerized polyester. When the color b value exceeds 5.0, yellow color of polymer becomes deep and when the color b value becomes greater in negative than −5.0, blue color becomes noticeable. When the color L value is less than 50, the polymer is readily darkened and clear transparency is difficult to achieve. When the color b value is in the range of −5.0 to 5.0 and the color L value exceeds 60, it would not cause a problem in terms of color tone. However, color L value exceeding 60 at an industrial scale results in a small degree of color tone improvement when subsequently formed products are made, for the high level of technical difficulty.

The copolymerized polyester E is achieved by the addition of specific amounts of a cobalt compound and a phosphorus compound in a production process of a copolymerized polyester containing ethylene terephthalate and neopentyl terephthalate as major repeating units using at least terephthalic acid, ethylene glycol and neopentyl glycol as starting material monomers and titanium compound and germanium compound as polymerization catalysts.

The amount of the terephthalic acid component relative to the entire dicarboxylic acid component is preferably not less than 70 mol %, particularly preferably not less than 85 mol %, specifically preferably not less than 95 mol % and most preferably 100 mol %. The dicarboxylic acid component other than the terephthalic acid component is the same as the dicarboxylic acid component other than the terephthalic acid component explained above.

The glycol component preferably consists of ethylene glycol (EG)/neopentyl glycol (NPG), wherein EG/NPG=60 to 99/1 to 40 (mol %) is preferable, EG/NPG=65 to 95/5 to 35 (mol %) is more preferable, and EG/NPG=65 to 85/15 to 35 (mol %) is particularly preferable. When the composition ratio of NPG to the entire glycol component is less than 1 mol %, the crystallization degree of the polyester becomes high and transparency becomes degraded and when the composition ratio of NPG exceeds 40 mol %, the degree of polymerization does not readily increase and a considerable length of time is required to reach a predetermined intrinsic viscosity. As a result, the color tone tends to become poor due to the thermal history during that time. When the composition ratio of NPG is too high, a predetermined intrinsic viscosity may not be reached.

To impart other function to the polyester or improve properties, different glycol components other than EG and NPG may be copolymerized. In this case, they are in the range of less than 10 mol % of the entire glycol component, wherein the amount ratio of EG and CHDM in this case is the same as above. As other glycol components, aliphatic glycols such as trimethylene glycol, tetramethylene glycol, pentamethylene glycol, hexamethylene glycol and the like; alicyclic glycols such as 1,4-cyclohexanedimethanol, 1,3-cyclohexanedimethanol and the like; aromatic glycols such as p-xylylene glycol, m-xylylene glycol and the like; and the like can be mentioned. Of these, 1,4-cyclohexanedimethanol is preferable. Any of these glycol components may be used alone or two or more kinds thereof may be used in combination at any ratio.

As the titanium compound and germanium compound to be used as polymerization catalysts, those exemplified above for the titanium compound and germanium compound can be used. The titanium compound and germanium compound preferably satisfy the following formulas (VIII) relative to copolymerized polyester, from the aspect of the polymerization activity and thermal stability. The lower limit of the following formula (VIII) is more preferably 60, particularly preferably 65, from the aspect of the polymerization activity. The upper limit of the following formula (VIII) is more preferably 90, particularly preferably 80, from the aspect of the thermal stability.

$$50 \leq (Ti/0.06 + Ge/3.33) \leq 100 \quad \text{(VIII)}$$

In the above formula (VIII), Ti is (ppm) of a titanium atom and Ge is (ppm) of germanium atom, relative to copolymerized polyester.

When the value of (Ti/0.06+Ge/3.33) in the above-mentioned formula (VIII) is less than 50, polymerization activity during production of copolymerized polyester tends to be insufficient. Therefore, when a subsequently formed product such as a film, a sheet, an engineering plastic and the like is produced from a copolymerized polyester with a degree of polymerization not sufficiently high (e.g., intrinsic viscosity of less than 0.60 dl/g), the mechanical property of the subsequently formed product may be degraded.

Alternatively, the polymerization time until the intrinsic viscosity of the copolymerized polyester reaches a particular range (e.g., intrinsic viscosity of 0.60 to 0.90 dl/g) becomes long, and productivity sometimes becomes dramatically low.

In contrast, when (Ti/0.06+Ge/3.33) of the above-mentioned formula (VIII) exceeds 100 and when a copolymerized polyester is formed, the thermal decomposition of the copolymerized polyester becomes intense and stable forming becomes difficult, which in turn may degrade the quality of a subsequently formed product.

It is important that the copolymerized polyester contain specific amounts of cobalt compound and phosphorus compound to improve the color tone of polyester.

As the cobalt compound, those exemplified above for the cobalt compound can be used, wherein the content is determined according to the content of the titanium compound. That is, a cobalt compound content is an amount that makes the ratio of titanium atom content to cobalt atom (Ti/Co) 0.05 to 0.2, wherein the lower limit is preferably 0.07, more preferably 0.08. The upper limit is preferably 0.15, more preferably 0.12. When the Ti/Co is less than 0.05, the color L value of the copolymerized polyester becomes low, in which case resins and other subsequently formed products are sometimes darkened or their color b value becomes low and a blue color becomes deep. In contrast, when Ti/Co exceeds 0.20, the color b value of the copolymerized polyester becomes markedly high, and a yellow color tends to become deep.

As the phosphorus compound, those exemplified above for the phosphorus compound can be used, wherein its content is determined according to the content of the cobalt compound and germanium compound. That is, the ratio (Co+Ge)/P of the total amount of the cobalt atom content (Co) and germanium atom content (Ge), and the phosphorus atom content (P), all relative to copolymerized polyester is preferably in the range of 1.0 to 3.5.

The lower limit of the aforementioned (Co+Ge)/P is more preferably 1.2, particularly preferably 1.5. When the aforementioned (Co+Ge)/P is less than 1.0, the polymerization activity of the copolymerized polyester cannot be increased sufficiently. In other words, the intrinsic viscosity of the copolymerized polyester cannot be increased to a particular range (e.g., intrinsic viscosity of 0.60 to 0.90 dl/g), or the time required to teach a predetermined intrinsic viscosity sometimes becomes long and the productivity may be dramatically degraded.

On the other hand, the upper limit of the aforementioned (Co+Ge)/P is more preferably 3.0, particularly preferably 2.5. When the aforementioned (Co+Ge)/P exceeds 3.5, by-products are readily produced in polyester, which tends to degrade the heat resistance of the copolymerized polyester. In addition, it also happens that color b value of the copolymerized polyester becomes high and a yellow color becomes deep, heat resistance is degraded, color L value becomes low and transparency becomes low, thereby degrading the quality of the copolymerized polyester articles subsequently formed therefrom.

In the copolymerized polyester, the titanium compound, germanium compound and cobalt compound can be added in any of the esterification step, initial polymerization step and late polymerization step, but the titanium compound is preferably added before the esterification reaction step.

Furthermore, the phosphorus compound is preferably added after the esterification reaction step. This is because addition of the phosphorus compound before the esterification reaction step increases generation of by-products during copolymerized polyester production.

The copolymerized polyester preferably has an intrinsic viscosity of 0.60 to 1.0 dl/g, wherein the lower limit of the intrinsic viscosity is more preferably 0.65 dl/g, particularly preferably 0.70 dl/g. The upper limit of the intrinsic viscosity is more preferably 0.85 dl/g, particularly preferably 0.80 dl/g.

When the intrinsic viscosity is less than 0.60 dl/g, mechanical properties of the formed products tend to become lower, and when the intrinsic viscosity exceeds 1.0 dl/g, the resin temperature becomes high during melting in a forming machine and the like and the thermal decomposition thereof tends to become intense. As a result, a free low molecular weight compound that affects aroma retention increases and problems of coloring of a subsequently formed article into yellow and the like readily occur.

In addition, when the copolymerized polyester is subsequently formed into a stepped formed plate, a haze value at a thickness of 5 mm is preferably not more than 5%, more preferably not more than 3%, particularly preferably not more than 1%. When the haze value exceeds 5%, transparency of the subsequently formed products is degraded and inapplicable to use that requires high level of transparency.

[Copolymerized Polyester F]

This copolymerized polyester comprises terephthalic acid or an ester-formable derivative thereof as a major acid component and ethylene glycol and neopentyl glycol as main glycol components, which is a copolymerized polyester chip obtained using antimony compound and germanium compound as catalysts and contains a phosphorus compound. It has an intrinsic viscosity of 0.60 to 1.0 dl/g, a color L value of 50 to 60 and a color b value of −5.0 to 5.0.

In other words, when a copolymerized polyester containing ethylene terephthalate and neopentyl terephthalate as major repeating units is produced using an antimony compound and a germanium compound as polymerization catalysts, the color tone of the copolymerized polyester should have a color L value of 50 to 60 and a color b value of −5.0 to 5.0 to achieve clear transparency of a copolymerized polyester. When the color b value exceeds 5.0, yellow color of polymer becomes deep and when the color b value becomes greater in negative than −5.0, blue color becomes noticeable. When the color L value is less than 50, the polymer is readily darkened and clear transparency is difficult to achieve. When the color b value is in the range of −5.0 to 5.0 and the color L value exceeds 60, it would not cause a problem in terms of color tone. However, color L value exceeding 60 at an industrial scale results in a small degree of color tone improvement when subsequently formed products are made, for the high level of technical difficulty.

The copolymerized polyester F is achieved by the addition of specific amounts of a phosphorus compound in a production process of a copolymerized polyester containing ethylene terephthalate and neopentyl terephthalate as major repeating units using at least terephthalic acid, ethylene glycol and neopentyl glycol as starting material monomers and antimony compound and germanium compound as polymerization catalysts.

The preferable compositions of the dicarboxylic acid component and glycol component are the same as those of the aforementioned copolymerized polyester E.

Glycol component other than EG and NPG may be used in a proportion of less than 10 mol % of the entire glycol component, wherein the glycol component in this case is the same as that in the copolymerized polyester E.

As the antimony compound and germanium compound to be used as polymerization catalysts, those exemplified above for the antimony compound and germanium compound can be used. The antimony compound and germanium compound preferably satisfy the following formula (VIV) relative to copolymerized polyester, from the aspect of the polymerization activity and thermal stability. The lower limit of the following formula (VIV) is more preferably 40, particularly preferably 45, from the aspect of the polymerization activity. The upper limit of the following formula (VIV) is more preferably 90, particularly preferably 80, from the aspect of the thermal stability.

$$30 \leq (Sb/3.90 + Ge/1.67) \leq 100 \quad \text{(VIV)}$$

In the above formula (VIV), Sb is (ppm) of an antimony atom and Ge is (ppm) of germanium atom, relative to copolymerized polyester.

The aforementioned formula (VIV) has been introduced from the experimental data of thermal stability and polymerization activity in a system concurrently using Sb catalyst and Ge catalyst, wherein the Sb catalyst content coefficient (reciprocal number of 3.90) and Ge catalyst content coefficient (reciprocal number of 1.67) in the aforementioned formula (VIV) derive from the difference in the polymerization activity of the Sb catalyst and Ge catalyst. In other words, the Ge catalyst has higher polymerization activity than the Sb catalyst, which means a greater influence of catalyst content.

When the value of (Sb/3.90+Ge/1.67) in the above-mentioned formula (VIV) is less than 30, polymerization activity during production of copolymerized polyester tends to be insufficient. Therefore, when a subsequently formed product such as a film, a sheet, an engineering plastic and the like is produced from a copolymerized polyester with a degree of polymerization not sufficiently high (e.g., intrinsic viscosity of less than 0.60 dl/g), the mechanical property of the subsequently formed product may be degraded.

Alternatively, the polymerization time until the intrinsic viscosity of the copolymerized polyester reaches a particular range (e.g., intrinsic viscosity of 0.60 to 0.90 dl/g) becomes long, and productivity sometimes becomes dramatically low.

In contrast, when (Sb/3.90+Ge/1.67) in the above-mentioned formula (VIV) exceeds 100, and when a copolymerized polyester is formed, the thermal decomposition of the copolymerized polyester becomes intense and stable forming becomes difficult, which in turn degrades the quality of a subsequently formed product.

It is important that the copolymerized polyester contain specific amounts of phosphorus compound to improve the color tone of polyester. From the aspect of improvement of color tone of copolymerized polyester, phosphorus compound is speculated to act as follows.

An oxygen acid having phosphorus as a central element has a tetrahedral structure having the total of four OH and H around the phosphorus atom. When orthophosphoric acid is condensed, condensed phosphoric acids such as polyphosphoric acid, metaphosphoric acid and the like are obtained. These condensed phosphoric acids readily coordinate to a metal ion.

Therefore, when a phosphorus compound and a free metal ion (ion such as germanium, antimony, cobalt and the like in the present invention) are present in a polymerization reaction system of polyester, the phosphorus compound preferentially reacts with a metal ion.

By reacting a germanium compound with a phosphorus compound at a particular molar ratio (mass ratio), the germanium compound is stabilized, and color b value can be minimized while maintaining the catalyst activity. In this case, when the phosphorus compound is present in excess, it reacts with the antimony compound and when, for example, the phosphorus compound is a phosphoric acid salt, it forms antimony phosphate. As a result, the antimony element is reduced and color L value decreases.

While a cobalt compound alone cannot give a blue color to polyester, a concurrent use with a phosphorus compound gives a blue color to polyester and color b value can be made small.

In this case, when the phosphorus compound is present in excess, the heat resistance of polyester itself becomes poor and the color b value increases. In contrast, when the amount of a phosphorus compound is small, it does not react with a cobalt compound and cannot give a blue color to polyester. In addition, since a free germanium compound increases, the color b value increases.

To be specific, the content of a phosphorus compound as a phosphorus metal preferably satisfies the following formula (X) relative to the content of germanium as a germanium metal, for improved color tone and thermal stability of copolymerized polyester. The lower limit of the following formula (X) is more preferably 0.5, particularly preferably 0.8, in view of the productivity.

$$0.2 \leq Ge/P \leq 2.0 \quad (X)$$

In the above formula, Ge means (ppm) of germanium atom, P means (ppm) of phosphorus atom relative to copolymerized polyester.

The upper limit of the above-mentioned formula (X) is more preferably 1.5, particularly preferably 1.2, from the aspect of color tone.

The ratio of the phosphorus metal and germanium metal in the above-mentioned formula (X) is less than 0.2, a free phosphorus compound reacts with an antimony compound and intensifies reduction of antimony metal. As a result, the color L value of copolymerized polyester becomes less than 50 or a 5 mm haze value exceeds 5% when a copolymerized polyester is subsequently processed to give a stepped formed plate, which degrades the product value.

When the ratio of phosphorus metal and germanium metal of the above-mentioned formula (X) exceeds 2.0, a yellow color of copolymerized polyester becomes deep and color b value becomes not less than 5, thus degrading the product value.

To make the color b value smaller in the copolymerized polyester, a cobalt compound is preferably added, wherein a cobalt compound is preferably added in a proportion of 1 to 30 ppm, more preferably 1 to 20 ppm, particularly preferably 1 to 15 ppm, as a cobalt metal relative to copolymerized polyester. As the cobalt compound, those mentioned above as specific examples of the cobalt compound can be used.

When the content of the cobalt metal exceeds 30 ppm, copolymerized polyester is darkened due to the reduction of a cobalt metal, a blue color becomes deep, color L value becomes less than 50, and color b value becomes less than −5, thus degrading the product value.

When the copolymerized polyester is produced by a direct esterification method, the antimony compound, germanium compound and cobalt compound can be added before the start of the esterification reaction, or at any time from the termination of the esterification reaction to the start of the initial polymerization reaction to the system, but the antimony compound is preferably added before the start of the esterification reaction.

Furthermore, the phosphorus compound is preferably added at any time from the termination of the esterification reaction to the start of the initial polycondensation reaction. This is because addition of the phosphorus compound before the start of subsequent esterification reaction increases subsequent generation of by-products during subsequent production of copolymerized polyester.

A preferable intrinsic viscosity of the copolymerized polyester is the same as that of the aforementioned copolymerized polyester E and the reason therefore is the same.

In addition, when the copolymerized polyester is subsequently formed into a stepped formed plate, a haze value at a thickness of 5 mm is preferably not more than 5%, more preferably not more than 3%, particularly preferably not more than 1%. When the haze value exceeds 5%, transparency of the subsequently formed products is degraded and inapplicable to use that requires high level of transparency.

The amorphous polyester chip of the present invention is problematic in that the productivity is low as compared to PET and the like. The present inventors have found a production method (polymerization method) that can produce a polymer having a high degree of polymerization with sufficient productivity, during the study to achieve the amorphous polyester chip of the present invention. The production method is explained in the following.

In a copolymerized polyester (first copolymerized polyester) chip comprising ethylene terephthalate and 1,4-dimethylene-cyclohexane terephthalate as major ester units, the following production method (production method A) increases the polymerization speed and a polyester having a desired high degree of polymerization can be produced with sufficient productivity.

[Production Method A]

It has been found that, according to this method, a starting material containing terephthalic acid as a major dicarboxylic acid component, and 20-80 mol % of ethylene glycol and 80-20 mol % of 1,4-cyclohexanedimethanol as major glycol components is subjected to esterification reaction, and during polycondensation reaction, an oligomer after esterification reaction is prepared to have a particular terminal carboxyl group concentration (AVo) and a particular terminal hydroxyl group concentration (OHVo), which in turn results in high polymerization (polycondensation) speed and production of a polymer having a high degree of polymerization in a short time, wherein an oligomer after esterification reaction satisfies the following formulas (XI) to (XIII):

$$200 \leq AVo < 600 \quad (XI)$$

$$600 \leq OHVo < 1800 \quad (XII)$$

$$0.65 < OH \% \leq 0.90 \quad (XIII)$$

In the formula (XI), Avo (eq/ton) means an equivalent amount of terminal carboxyl group in 1 ton of an oligomer. In the formula (XII), OHVo (eq/ton) means an equivalent amount of terminal hydroxyl group in 1 ton of an oligomer. In the formula (XIII), moreover, OH % is a property value defined by OHVo/(OHVo+AVo).

That is, AVo of the oligomer after esterification reaction is preferably 200-600 eq/ton. The lower limit of Avo is more preferably 300 eq/ton, particularly preferably 350 eq/ton. The upper limit of Avo is more preferably 500 eq/ton, particularly preferably 450 eq/ton.

The OHVo of the oligomer after esterification reaction is preferably 600 to 1800 eq/ton. The lower limit of OHVo is more preferably 800 eq/ton, particularly preferably 1000 eq/ton. The upper limit of OHVo is more preferably 1500 eq/ton, particularly preferably 1200 eq/ton.

Moreover, OH % of the oligomer after esterification reaction is preferably 0.65 to 0.90. The lower limit of OH % is particularly preferably 0.70. The upper limit of OH % is more preferably 0.85, particularly preferably, 0.80.

When AVo of the oligomer after esterification reaction is less than 200 eq/ton or OHVo exceeds 1800 eq/ton, or OH % exceeds 0.90, sufficient polymerization speed cannot be obtained and productivity is markedly degraded. When AVo of oligomer after esterification reaction exceeds 600 eq/ton, or OHV is less than 600 eq/ton, or OH % is less than 0.65, sufficiently high degree of polymerization of polymer sometimes cannot be achieved (e.g., intrinsic viscosity does not reach not less than 0.60 dl/g), or polymerization speed is slow and productivity is sometimes markedly degraded.

The "after esterification reaction" in this production method means the state before polycondensation reaction in vacuo, and generally indicates the time when esterification reaction under pressurization or normal pressure is completed.

To ensure that oligomer characteristic of the oligomer after esterification reaction falls within the aforementioned particular range, optimization of the molar ratio (G/A) of the entire glycol component (G) and entire dicarboxylic acid component (A) of the starting material when charged and optimization of esterification reaction conditions are important.

The G/A during esterification reaction is preferably 1.3 to 3.0, more preferably 1.5 to 2.5, particularly preferably 1.75 to 2.25. That is, the amount of the entire glycol component (G) is made greater than the entire dicarboxylic acid component amount (A). To achieve this state, the aforementioned G/A may be set to 1.3 to 3.0 when charging the starting material or a glycol component may be further added at any stage in the esterification reaction.

When G/A on charging the starting material is less than 1.3, the esterification reaction does not proceed sufficiently and the degree of polymerization tends to fail to reach a predetermined viscosity, whereas when it is greater than 3.0, operation efficiency and heat efficiency unpreferably tend to become poor due to the removal of excess glycol, or terminal balance becomes poor, so that the polymer tends to fail to reach a predetermined viscosity.

For the esterification reaction, temperature, pressure and average residence time (affected by the number of reactors) are particularly important. The temperature during esterification reaction is preferably 240 to 270° C., more preferably 245 to 265° C., particularly preferably 255 to 265° C. When the reaction temperature is lower than 240° C., the esterification reaction does not proceed sufficiently and the degree of polymerization tends to fail to reach a predetermined viscosity, whereas when it exceeds 270° C., the esterification reaction unpreferably tends to not sufficiently proceed because glycol is evaporated before esterification reaction.

The pressure in the reactor during esterification reaction is preferably from atmospheric pressure to 0.1 MPa, more preferably from atmospheric pressure to 0.05 MPa, particularly preferably from atmospheric pressure to 0.02 MPa. When the pressure in the reactor during esterification reaction is less than the atmospheric pressure, the esterification reaction unpreferably tends to not sufficiently proceed because glycol is evaporated before esterification reaction, and when the pressure in the reactor during esterification reaction exceeds 0.1 MPa, water produced in the esterification reaction is not readily distilled from the system, and the esterification reaction tends to become insufficient.

The average residence time of the esterification reaction is preferably 2 to 5 hours, particularly preferably 3 to 4 hours. The number of reactors for the esterification is preferably 1 to 5, particularly preferably 2 to 4.

By suitably controlling the molar ratio (G/A) of the entire glycol component (G) and the entire dicarboxylic acid component (A) of the starting material when charged and esterification reaction conditions, an oligomer wherein a terminal carboxyl group concentration, a terminal hydroxyl group concentration, and OH % derived from the relational formula of these are controlled to fall within particular ranges, can be obtained.

Thereafter, a polycondensation reaction step begins. The polycondensation reaction step is preferably performed in two steps including an initial polycondensation reaction step using a comparatively high pressure in the reactor under reduced pressure, and a late polycondensation reaction step using a comparatively low pressure in the reactor under reduced pressure. That is, by performing the polycondensation reaction in two steps in this way and by gradually lowering the internal pressure in the reactor, a rapid polycondensation reaction can be obliterated and a mild reaction can be carried out. As a result, adhesion of oligomer to the wall of a reactor due to bumping, clogging of a distillation reactor and the like can be prevented, thereby stabilizing the step.

The conditions of the initial polycondensation reaction comprise a preferably temperature of 260 to 285° C., more preferably 265 to 280° C., particularly preferably 265 to 270° C. The pressure is preferably 1000 to 13000 Pa, more preferably 1000 to 8000 Pa, particularly preferably 1000 to 6500 Pa. The average residence time in the initial polymerization reaction is preferably 1 to 4 hours, particularly preferably 2 to 3 hours. The number of reactors in the initial polymerization is preferably 1 to 3, particularly preferably 1 or 2.

The conditions of the late polymerization reaction comprise a preferably temperature of 270 to 285° C., particularly preferably 270 to 280° C. The pressure is preferably 1 to 300 Pa. Particularly, the pressure of the final reactor is more preferably 1-150 Pa, particularly preferably 1 to not more than 80 Pa. The average residence time in the late polymerization reaction is preferably 1 to 4 hours, particularly preferably 2 to 3 hours. The number of reactors in the late polymerization is preferably 1 or 2.

As the polymerization catalyst, at least one kind of an antimony compound, a germanium compound and a titanium compound may be used alone or two or more kinds thereof may be used in combination.

As the antimony compound, germanium compound and titanium compound, those exemplified above for the antimony compound, germanium compound and titanium compound can be respectively used.

The antimony compound is preferably contained in the proportion of 0.01 to 0.04 mol %, more preferably 0.015 to 0.03 mol %, particularly preferably 0.02 to 0.025 mol %, relative to the produced copolymerized polyester. When the content of the antimony compound is less than 0.01 mol %, sufficient polymerization activity cannot be obtained and the degree of polymerization cannot be increased sufficiently. When the content of the antimony compound exceeds 0.04 mol %, the heat resistance of the copolymerized polyester becomes markedly degraded and thermal decomposition increases. As a result, a free low molecular weight compound that affects flavor retention increases and problems of coloring of a subsequently formed article in yellow occurs.

The germanium compound is preferably contained in the proportion of 0.005 to 0.05 mol %, more preferably 0.01 to 0.03 mol %, particularly preferably 0.015 to 0.025 mol %, relative to the produced copolymerized polyester. When the content of the germanium compound is less than 0.005 mol %, sufficient polymerization activity cannot be obtained and the degree of polymerization cannot be increased sufficiently. When the content of the germanium compound exceeds 0.05 mol %, the heat resistance of the copolymerized polyester becomes markedly degraded and thermal decomposition becomes intensive. As a result, a free low molecular weight compound that affects flavor retention increases and problems of coloring of subsequently formed article in yellow occurs.

The titanium compound is preferably contained in the proportion of 0.0005 to 0.02 mol %, more preferably 0.002 to 0.015 mol %, particularly preferably 0.005 to 0.01 mol %, relative to the produced copolymerized polyester. When the content of the titanium compound is less than 0.0005 mol %, sufficient polymerization activity cannot be obtained and the degree of polymerization cannot be increased sufficiently. When the content of the titanium compound exceeds 0.02 mol %, the heat resistance of the copolymerized polyester becomes markedly degraded and thermal decomposition becomes intensive. As a result, a free low molecular weight compound that affects flavor retention increases and problems of coloring of subsequently formed article in yellow occurs.

The aforementioned polymerization catalyst may be added in any reaction of esterification reaction, initial polymerization reaction and late polymerization reaction. When a titanium compound is used, however, addition prior to esterification reaction is preferable, and other polymerization catalysts and stabilizers are preferably added after esterification reaction.

To improve color tone of the copolymerized polyester, moreover, specific amounts of alkaline earth metal compound and phosphorus compound are preferably added after esterification. As these alkaline earth metal compound and phosphorus compound, those exemplified for the aforementioned alkaline earth metal compound and phosphorus compound can be used.

The alkaline earth metal compound is preferably contained in a proportion of 0.001 to 0.040 mol %, more preferably 0.005 to 0.025 mol %, particularly preferably 0.010 to 0.020 mol %, relative to the resulting copolymerized polyester.

The phosphorus compound is preferably contained such that the molar ratio (M/P) of alkaline earth metal (M)/phosphorus compound (P) relative to the above-mentioned alkaline earth metal compound is 0.2 to 3.5, more preferably 0.75 to 1.75, particularly preferably 0.8 to 1.2.

The phosphorus compound shows different preferable range of content relative to the resulting copolymerized polyester, depending on the kind of polymerization catalyst to be used. When an antimony compound is used as a polymerization catalyst, it is preferably added in a proportion of 0.001 to 0.005 mol % relative to the resulting copolymerized polyester. When a germanium compound or a titanium compound is used, an equimolar of phosphorus compound is preferably added relative to the germanium compound or titanium compound.

To improve color tone of the copolymerized polyester, a cobalt compound may be further added, and when a cobalt compound is concurrently used with a phosphorus compound, equimolar amounts of the cobalt compound and the phosphorus compound are preferably added.

As the aforementioned cobalt compound, those exemplified for the aforementioned cobalt compound can be used.

The obtained copolymerized polyester is generally extracted in strands from an extraction opening (die nozzle) formed on the bottom part of a reactor, cooled with water, cut in chips, and then subjected to chip dry treatment by the aforementioned fluidized bed drying apparatus or drying and fine particle removal treatment, whereby a chip having a sufficiently reduced moisture content and sufficiently low fine particle and sufficiently low crude by-product contents can be obtained.

The foregoing is a method for highly productively producing a copolymerized polyester (first copolymerized polyester) chip comprising ethylene terephthalate and 1,4-dimethylene-cyclohexane terephthalate as major ester units. In a copolymerized polyester (second copolymerized polyester) chip comprising ethylene terephthalate and neopentyl terephthalate as major ester units, the following method (production method B) can increase polymerization speed and an object polymer having a high degree of polymerization can be produced with fine productivity.

[Production Method B]

That is, this method relates to a method comprising directly subjecting a starting material containing terephthalic acid as a major dicarboxylic acid component and ethylene glycol and neopentyl glycol as major glycol components to esterification reaction, and then polycondensation reaction. The method is characterized in that a polycondensation speed is high and a polymer having a high degree of polymerization can be obtained in a short time by controlling the number of carboxyl terminal group and the number of hydroxyl terminal group of oligomer after esterification reaction to satisfy the following formulas (XIV) to (XVI):

$$200 \leq AVo \leq 800 \quad (XIV)$$

$$900 \leq OHVo \leq 1800 \quad (XV)$$

$$0.53 \leq OH\% \leq 0.90 \quad (XVI)$$

In the formula (XIV), Avo (eq/ton) means an equivalent amount of terminal carboxyl group in 1 ton of an oligomer. In the formula (XV), OHVo (eq/ton) means an equivalent amount of terminal hydroxyl group in 1 ton of an oligomer. In the formula (XVI), moreover, OH % means OHVo/(OHVo+AVo).

That is, AVo of the oligomer after esterification reaction is preferably 200 to 800 eq/ton. The lower limit of Avo is more preferably 300 eq/ton, particularly preferably 350 eq/ton. The upper limit of Avo is more preferably 600 eq/ton, particularly preferably 450 eq/ton.

The OHVo of the oligomer after esterification reaction is preferably 900 to 1800 eq/ton. The lower limit of OHVo is more preferably 1000 eq/ton, particularly preferably 1100 eq/ton. The upper limit of OHVo is more preferably 1500 eq/ton, particularly preferably 1300 eq/ton.

Moreover, OH % of the oligomer after esterification reaction is preferably 0.53 to 0.90. The lower limit of OH % is more preferably 0.65, particularly preferably 0.70. The upper limit of OH % is more preferably 0.85, particularly preferably, 0.80.

When AVo of the oligomer after esterification reaction is less than 200 eq/ton or OHVo exceeds 1800 eq/ton, or OH % exceeds 0.90, sufficient polymerization speed cannot be obtained and productivity is markedly degraded. When AVo exceeds 800 eq/ton, or OHVo is less than 900 eq/ton, or OH % is less than 0.53, sufficiently high degree of polymerization cannot be achieved (e.g., intrinsic viscosity does not reach not less than 0.60 dl/g), or polymerization speed is slow and productivity is sometimes markedly degraded.

The "after esterification reaction" in this method means the state before polycondensation reaction in vacuo, and generally indicates the time when esterification reaction under pressurization or normal pressure is completed.

To control oligomer characteristic after esterification reaction to fall within the aforementioned particular range, optimization of the molar ratio (G/A) of the entire glycol component (G) and entire dicarboxylic acid component (A) of the starting material when charged and optimization of esterification reaction conditions are important, and these are preferably set to the same range as in the aforementioned production method A.

As the polymerization catalyst, at least one kind of an antimony compound, a germanium compound and a titanium compound may be used alone or two or more kinds thereof may be used in combination. The amounts thereof to be used (relative to copolymerized polyester content) are preferably the same as those in the aforementioned production method A for the same reasons.

To improve color tone of the copolymerized polyester, moreover, a specific amount of phosphorus compound is preferably added after esterification, wherein the phosphorus compound is the same as those exemplified for the aforementioned phosphorus compound.

When an antimony compound is used as a polymerization catalyst, the phosphorus compound is preferably added in a proportion of 0.001 to 0.005 mol % relative to the resulting copolymerized polyester, as in the aforementioned production method A. When a germanium compound or a titanium compound is used, an equimolar of phosphorus compound is preferably added relative to the germanium compound or titanium compound.

To improve color tone of the copolymerized polyester, moreover, a cobalt compound may be further added. When a cobalt compound is concurrently used with a phosphorus compound, equimolar amounts of the cobalt compound and the phosphorus compound are preferably added. As the cobalt compound, those exemplified for the aforementioned cobalt compound can be used.

The obtained copolymerized polyester is generally extracted in strands from an extraction opening (die nozzle) formed on the bottom part of a reactor, cooled with water, cut in chips, and then subjected to chip dry treatment by the aforementioned fluidized bed drying apparatus or drying and fine particle removal treatment, whereby a chip having a sufficiently reduced moisture content and sufficiently low fine particle and sufficiently low crude by-product contents is obtained.

The measurement methods of the major property values in the present specification are described in the following.

1. Moisture Content of Polyester Chip

Using a moisture content measuring apparatus (VA-05, manufactured by Mitsubishi Kasei Kogyo Co., Ltd.) and under the conditions of 230° C. for 10 min, chips (1 to 2 g) were subjected to a heat treatment to evaporate the moisture in the chips and the moisture content was measured.

2. Contents of Fine Particle and Crude By-Product

Resin chips (0.5 kg) were placed on a stainless wired sieve (A) (diameter 20 cm, nominal size 5.6 mm, wire diameter 1.6 mm) and a stainless-wired sieve (B) (diameter 20 cm, nominal size 1.7 mm, wire diameter 0.8 mm) in two steps, according to JIS-Z8801, and put through the sieve at 1800 rpm for 1 min using an oscillating sieve shaker (SNF-7, manufactured by TERAOKA CORPORATION).

This operation was repeated, and a total of 20 kg of the resin chips were put through a sieve. The particles that were passed through a sieve were washed with ion exchange water and collected by passing through a G1 glass filter (pore size: 100-120 KLm) manufactured by Iwaki Glass Co., Ltd. Then the chips were placed in a dryer together with the glass filter, dried at 100° C. for 2 hours, cooled and weighed. Washing with ion exchange water and drying were repeated, and after confirmation of reaching the constant weight, the weight of the glass filter was subtracted from this weight to give a fine particle weight.

On the other hand, the product collected on the sieve (A) was also washed with ion exchange water and collected by passing through a GI glass filter manufactured by Iwaki Glass Co., Ltd. Then the chips were placed in a dryer together with the glass filter, dried at 100° C. for 2 hours, cooled and weighed. Furthermore, washing with ion exchange water and drying were repeated, and after confirmation of reaching the constant weight, the weight of the glass filter was subtracted from this weight to give a crude by-product weight.

The content of the fine particles and that of the crude by-product were obtained from the following formulas:

fine particle content=weight of fine particles/weight of entire resin (chips)

crude by-product content=weight of crude by-product/ weight of the entire resin (chips)

3. Composition of Polyester

A sample (5 mg) was dissolved in a mixed solution (0.7 mL) of d-chloroform and trifluoroacetic acid (=9/1; volume ratio) and determined using $^1$H-NMR (UNITY500 manufactured by Varian).

4. Diethylene Glycol Content in Polyester (Hereinafter "DEG Content")

A polyester is decomposed with methanol, a DEG amount is quantitatively determined by gas chromatography and the content is expressed in the proportion (mol %) relative to the entire glycol component.

5. Elemental Analysis

Elemental analysis is performed according to the method shown in the following.

To show the composition of the following metal compound or a phosphorus compound in mol % relative to copolymerized polyester, calculation is done using the following formula:

$$C2=(M/N) \times C1 \times 10^{-4}/A$$

In the above-mentioned formula, C2 means the composition (mol %) of a metal compound or a phosphorus compound relative to copolymerized polyester, M means a molecular weight of the repeating unit of copolymerized polyester, N means the number of the metal atom or phosphorus atom in the compound, C1 means (ppm) of a metal atom or a phosphorus atom in the copolymerized polyester, and A means an atomic weight of a metal atom or a phosphorus atom.

(a) Alkaline Earth Metal Compound

A sample (1 g) is placed in a platinum crucible and ashed. Then, 6 mol/L of hydrochloric acid is added and evaporated to dryness. The residue is dissolved in 1.2 mol/L of hydrochloric acid and emission intensity is measured using an ICP emission spectrometer (ICPS-2000, manufactured by Shimadzu Corporation). Then, the content (ppm) of the alkaline earth metal atom in the sample is measured from the calibration curve drawn in advance. This is converted to the amount of an alkaline earth metal compound relative to copolymerized polyester, and expressed in the unit of mol %. Zn and Mn used as a transesterification catalyst can be also quantitatively determined by a similar method.

(b) Phosphorus Compound

A phosphorus compound is converted to an orthophosphoric acid by a method comprising dry ashing a sample (1 g) in the coexistence of sodium carbonate, or a method comprising wet ashing a sample (1 g) with a mixed solution of sulfuric acid/nitric acid/perchloric acid or a mixed solution of sulfuric acid/aqueous hydrogen peroxide solution. Then, molybdate is reacted in 1 mol/L of a sulfuric acid solution to give phosphomolibdic acid, which is reduced with hydrazine sulfate to give heteropoly blue. Absorbance at a wavelength of 830 nm is measured using an absorptiometer (UV-150-02 manufactured by Shimadzu Corporation). Then, the content (ppm) of the phosphorus atom in the sample is measured from the calibration curve drawn in advance. This is converted to the amount of a phosphorus compound relative to copolymerized polyester, and expressed in the unit of mol %.

(c) Alkali Metal Compound

A sample (1 g) is placed in a platinum crucible and ashed. Then, 6 mol/L of hydrochloric acid is added and evaporated to dryness. The residue is dissolved in 1.2 mol/L of hydrochloric acid and absorbance is measured using an atomic absorption photometer (AA-640-12, manufactured by Shimadzu Corporation). Then, the content (ppm) of the alkaline metal atom in the sample is measured from the calibration curve drawn in advance. This is converted to the amount of an alkaline metal compound relative to copolymerized polyester, and expressed in the unit of mol %.

(d) Antimony Compound

A sample (1 g) is wet decomposed with a mixed solution of a sulfuric acid/aqueous hydrogen peroxide solution. Then, sodium nitrite is added to convert Sb atom to $Sb^{5+}$, brilliant green is added to form a blue complex with antimony. After extraction of this complex with toluene, the absorbance at a wavelength of 625 nm is measured using an absorptiometer (UV-150-02, manufactured by Shimadzu Corporation). Then, the content (ppm) of the antimony atom in the sample is measured from the calibration curve drawn in advance. This is converted to the amount of an antimony compound relative to copolymerized polyester, and expressed in the unit of mol %.

(e) Germanium Compound

A sample (2 g) is placed in a platinum crucible for ashing, and 10 wt % of a sodium hydrogen carbonate solution (5 mL) is added and evaporated, after which hydrochloric acid is added and evaporated to dryness. The temperature is raised from 400° C. to 950° C. in an electric furnace, and the mixture is stood for 30 min to melt the residue. The fused product is dissolved in water (10 mL) by heating, and transferred to a distillation apparatus. The inside of the platinum crucible is washed twice with 7.5 mL of ion exchange water, and this washing is also transferred to the aforementioned distillation apparatus. Hydrochloric acid (35 mL) is added and the mixture is distilled to give a distillate (25 mL). A suitable amount is separated from the distillate, and hydrochloric acid is added to make the final concentration 1.0 to 1.5 mol/L. Further, a 0.25 wt % polyvinyl alcohol solution (2.5 mL) and a 0.04 wt % phenylfluorene (2,3,7-trihydroxy-9-phenyl-6-fluorene) solution (5 mL) were added to form a yellow complex with germanium. After adjusting to 25 mL with ion exchange water, the absorbance at a wavelength of 505 nm is measured using an absorptiometer (UV-150-02, manufactured by Shimadzu Corporation). Then, the content (ppm) of the germanium atom in the sample is measured from the calibration curve drawn in advance. This is converted to the amount of a germanium compound relative to copolymerized polyester, and expressed in the unit of mol %.

(f) Titanium Compound

A sample (1 g) is placed in a platinum crucible and ashed. Then, sulfuric acid and potassium hydrogen sulfate are added and dissolved by heating. The melted product is dissolved in 2 mol/L of sulfuric acid. Aqueous hydrogen peroxide is added and absorbance at a wavelength of 420 nm is measured using an absorptiometer (UV-150-02, manufactured by Shimadzu Corporation). Then, the content (ppm) of the titanium atom in the sample is measured from the calibration curve drawn in advance. This is converted to the amount of a titanium compound relative to copolymerized polyester, and expressed in the unit of mol %.

(g) Cobalt Compound

A sample (1 g) is placed in a platinum crucible and ashed. Then, 6 mol/L of hydrochloric acid is added and evaporated to dryness. This is dissolved in 1.2 mol/L of hydrochloric acid and emission intensity is measured using an ICP emission spectrometer (ICPS-2000, manufactured by Shimadzu Corporation) Then, the content (ppm) of the cobalt atom in the sample is measured from the calibration curve drawn in advance. This is converted to the amount of a cobalt compound relative to copolymerized polyester, and expressed in the unit of mol %.

6. Oligomer Terminal Carboxyl Group Concentration (AVo)

A sample (1 g) is precisely weighed, pyridine (20 mL) is added and the mixture is heated under reflux for 15 min. After dissolution, water (10 mL) is added and the mixture is allowed to cool. Titration is performed with 0.1N-sodium hydroxide using phenolphthalein as an indicator. The terminal carboxyl group concentration (AVo) of the oligomer is determined from the following formula:

$$Avo(eq/ton) = ((A-B) \times 0.1 \times F)/(Wg \times 10^3) \times 10^6$$

In the above formula, A means a titration amount (mL), B means a blank titration amount (mL), F means a factor of 0.1N-sodium hydroxide used, and Wg means a weight (g) of the sample.

7. Oligomer Terminal Hydroxyl Group Concentration (OHVo)

A sample (0.5 g) is precisely weighed and a mixed solution of acetic anhydride (0.51 g) and pyridine (10 mL) is added. The mixture is reacted at 95° C. for 1.5 hours. Distilled water (10 mL) is added to the reaction mixture and the mixture is allowed to cool at room temperature. Titration is performed with 0.2N-sodium hydroxide solution (solution: water/methanol=5/95; volume ratio) using phenolphthalein as an indicator. The terminal hydroxyl group concentration of the oligomer is determined from the following formula:

$$OHV(eq/ton) = ((B-A) \times F)/(Wg \times 10^3) \times 10^6$$

In the above formula, A means a titration amount (mL), B means a blank titration amount (mL), F means a factor of 0.2N-sodium hydroxide used, and Wg means a weight (g) of the sample.

8. Polyester terminal carboxyl group concentration (AVo)

Polyester chips are pulverized, dried, and 0.2 g of dried product is dissolved in 10 mL of benzyl alcohol by heating. The concentration is determined by titration with potassium alcholate using phenol red as an indicator.

9. Intrinsic Viscosity (IV) of Polyester

Polyester is dissolved in a mixed solvent of 25 mL of 1,1,2,2-tetrachloroethane/phenol (=2/3; weight ratio) and solution viscosity is measured at 30° C. using an Ostwald viscometer.

10. Glass Transition Temperature of Polyester

A sample (10 mg) is placed and sealed in an aluminum pan and subjected to the measurement using a differential scanning calorimeter (DSC-50, manufactured by Shimadzu Corporation) under the following conditions.

First, the temperature is raised from room temperature to 300° C. at 20° C./min, and the aluminum pan is placed in liquid nitrogen and rapidly cooled. The rapidly cooled sample is heated again to 300° C. at 20° C./min and the glass transition temperature is determined.

11. Color Tone

The color L value and color b value are measured according to JIS Z 8722 using a calorimeter (Model 1001DP, manufactured by Nippon Denshoku Industries Co., Ltd.).

12. Foreign Substance in Polymer

A copolymerized polyester chip (one grain) is sandwiched between two sheets of cover glass, melt-pressed at 280° C. and rapidly cooled. It is observed in 20 visual fields using a phase microscope at a magnification of 100 times and the number of unmelted foreign substances having a size of not less than 10 μm is counted using an image analyzer (Luzex FS, manufactured by Nireco Corporation).

13. Melt Specific Resistance ($\rho i(\Omega \cdot cm)$) of polyester

Two electrodes (stainless needles) are placed in a sample melted at 275° C. and the current ($i_o$) upon application of voltage of 120 V is measured, which is inserted into the following formulas for calculation:

$$\rho i(\Omega \cdot cm) = (AL) \times (V/i_o)$$

In the above-mentioned formula, A means an area ($cm^2$) between electrodes, L means a distance (cm) between electrodes, and V means a voltage (V).

14. Electrostatic Adhesion of Polyester

A tungsten wire electrode is disposed between a spinneret and a cooling drum of an extruder, a 10-15 kV voltage is applied between the electrode and a casting drum to achieve melt extrusion at 275° C. for casting. The surface of the obtained casting whole cloth is visually observed, the casting speed is gradually increased and the speed at which pinner bubbles start to occur is taken as the maximum casting speed. It means that the greater the maximum casting speed is, the better the electrostatic adhesion is.

15. Uniformity of Composition of Subsequently Formed Product (Film)

The composition of each chip of plural kinds of chips used as film starting materials is analyzed, and the composition of a chip mixture calculated from the weight ratio when mixing them is calculated. On the other hand, plural kinds of chips are mixed, and the composition of a film produced using the chip mixture thereof as a starting material is measured according to the methods described in the aforementioned 3 and 4. The uniformity of composition of the subsequently formed product (film) is evaluated based on the difference between these compositions.

16. Mechanical Strength of Subsequently Formed Product (Film)

A film monoaxially drawn in the transverse direction at a draw ratio of 4 is subjected to a tension test in the direction orthogonal with the drawing direction under the following conditions according to JIS K 7127. The number of samples is 20. The measurement conditions are length of test piece 200 mm, distance between chucks 100 mm, width of test piece 15 mm, temperature 200C., tensile speed 200 mm/min. The number of samples that were broken at elongation of not more than 5% is counted, a percentage against the entire number of samples (20) is determined and taken as a breaking ratio (%). As used herein, when the number of samples having an elongation at break of not more than 5% is not more than 10% of the number of the entire samples, the presence of superior mechanical strength is acknowledged.

17. Haze

First method: measured according to JIS K7105. A sample was taken out from a film (thickness 45 μm) and the haze (%) was measured with a haze meter (Model NDH2000, manufactured by Nippon Denshoku Industries Co., Ltd.).

Second method: a copolymerized polyester is melted at 280° C. using an injection molding machine (M-150C-DM, manufactured by MEIKI CO., LTD.), a stepped formed plate having a thickness of 2-11 mm is formed at a mold temperature of 15° C., and haze (%) of a part having a thickness of 5 mm is measured with a haze meter (Model NDH2000, manufactured by Nippon Denshoku Industries Co., Ltd.).

18. Solvent Adhesiveness

THF (tetrahydrofuran, 3.0±0.3 $g/mm^2$) is applied in the longitudinal direction in a 2±1 mm width at a little inside from an end of one surface having a size of length 150 mm×width 200 mm at room temperature. The film is immediately rolled and ends are superimposed and adhered to process the article into a tube. The state of films (presence or absence of peeling between films) is visually observed. When peeling between the films is not found by this evaluation method, the solvent adhesiveness is judged to be fine.

19. Thickness Uniformity of Film

Samples for thickness measurement, which are twenty 50 cm long, 5 cm wide films, are prepared, the thickness of each sample in the length direction is measured with a contact type thickness meter (KG60/A, manufactured by Anritsu Corporation), thickness dispersion is determined by the following formula, and the average value thereof is taken as the thickness dispersion of the film.

Thickness dispersion (%)=(maximum thickness−minimum thickness)/average thickness×100

20. Formability of Film

Dry copolymerized polyester (50 wt %) and dry polyethylene terephthalate (50 wt %) having an intrinsic viscosity of 0.60 dl/g are uniformly mixed, and the mixture is melt extruded at 280° C. using an extruder having a T-die, rapidly cooled on a rotary metal drum having a surface temperature of 40° C. to give a non-drawn sheet. This non-drawn sheet is stretched 3.5 times in the longitudinal direction at 80° C., then 3.6 times in the transverse direction at 95° C., and further heat treated at 205° C. to give a biaxially drawn film having a thickness of 188 μm. The film is printed, heated at 130° C. for 5 sec, and pressed at mold temperature 80° C., pressure retention time 5 sec. ABS resin is injected into the formed part at 210° C. (injection molding) to prepare a key top (height 3 mm) covered with the film. Printing shift then is measured, the state of forming is visually observed and ranked according to the following criteria, wherein each of ⊙ and ○ is a pass and X is a fail.

⊙: printing shift is not more than 0.1 mm, and appearance is extremely fine.

○: printing shift is not less than 0.1 mm and printing shift is not more than 0.2 mm. Small wrinkles are observed, which is free of practical problems.

X: printing shift exceeds 0.2 mm or the film shows breaks. Alternatively, clear wrinkle is seen and markedly poor in appearance.

21. Defect on Film

A biaxially drawn film obtained under the conditions of the above-mentioned 20 is subjected to visual measurement of the number of defects on 1 $m^2$ of the film and ranked according to the following criteria. Note that ⊙ (fine) and ○ (somewhat fine) are each a pass.

⊙ (fine): the number of defect is 0

○ (somewhat fine): the number of defect is 1 to 3

Δ (somewhat defective): the number of defect is 4 to 5

X (defective): the number of defect is not less than 6

The present invention is explained in detail by referring to Examples and Comparative Examples. The present invention is not limited by the following Examples.

EXAMPLE 1

A continuous type polymerization equipment was used.

A slurry having a composition ratio (molar ratio) of high purity terephthalic acid, ethylene glycol, 1,4-cyclohexanedimethanol and diethylene glycol of 100//80.0/19.0/1.0 was continuously fed into a first esterification reactor wherein a reaction product remained. Furthermore, esterification reaction was carried out with stirring at 250° C., 0.05 MPa to make the average residence time 3 hours.

The reaction product is transferred to a second esterification reactor and subjected to esterification reaction with stirring at 260° C., 0.05 MPa to make the average residence time 1 hour. This reaction product is transferred to a third esterification reactor and subjected to esterification reaction with stirring at 260° C., 0.05 MPa until a predetermined esterification rate is achieved to give an oligomer. The obtained oligomer showed a terminal carboxyl group concentration (AVo) of 300 eq/ton and a terminal hydroxyl group concentration (OHVo) of 1000 eq/ton.

To this oligomer were added continuously to achieve 0.0225 mol % of antimony trioxide in a 12 g/L ethylene glycol solution, 0.117 mol % of magnesium acetate 4 hydrate in a 50 g/L ethylene glycol solution, 0.010 mol % of sodium acetate in a 10 g/L ethylene glycol solution, and 0.035 mol % of trimethyl phosphate in a 65 g/L ethylene glycol solution, relative to the resulting polyester, by separately adding these solutions to a third esterification reactor.

The product resulting from the esterification reaction was continuously fed to the first polycondensation reactor to conduct polycondensation with stirring at 265° C., 35 hPa for 1 hour, then in the second polycondensation reactor with stirring at 270° C., 5 hPa for 1 hour, and further in the final polycondensation reactor with stirring at 280° C., 0.5 to 1.5 hPa for 1 hour. The obtained polyester in a molten state was extracted in strands from a die nozzle, cooled with water in a cooling bath and pelletized with a cutter to give a chip.

The obtained chip was transferred into a fluidized bed type drying apparatus (volume 400 m$^3$, L/D=3.5) with a nitrogen gas. Then, a dry nitrogen gas heated to 60° C. and having a moisture content of 0.2 ppm was continuously fed into a fluidized bed type drying apparatus and the chip was retained for 72 hours. This was used as polyester (chip) A.

The obtained polyester A had an intrinsic viscosity of 0.75 dl/g, a composition of terephthalic acid//ethylene glycol/1,4-cyclohexanedimethanol/diethylene glycol=100//66.5/30.5/3.0 (molar ratio) and was non-crystalline. Polyester A had a moisture content of 15 ppm, a fine particle content of 30 ppm, a crude by-product content of 0.1 wt %, a glass transition temperature of 84° C. and a terminal carboxyl group concentration of 16 eq/ton.

In the same manner as in the production of polyester A except that the composition ratio of the monomer to be supplied was changed to high purity terephthalic acid, ethylene glycol, neopentyl glycol, and diethylene glycol=100//73.5/24.5/2.0 (molar ratio), polymerization, pelletizing and drying were performed. This was used as polyester (chip) B.

The obtained polyester B had an intrinsic viscosity of 0.75 dl/g, a composition of terephthalic acid//ethylene glycol/neopentyl glycol/diethylene glycol=100//67.0/30.0/3.0 (molar ratio) and was non-crystalline. Polyester B had a moisture content of 15 ppm, a fine particle content of 25 ppm, a crude by-product content of 0.15 wt %, a glass transition temperature of 79° C. and a terminal carboxyl group concentration of 10 eq/ton.

The two kinds of copolymerized polyester (polyester A and polyester B) chips obtained above were mixed at a ratio of polyester A/polyester B (weight ratio) of 70/30. This chip mixture was melt-extruded at 280° C., stretched 4 times in the transverse direction at 80° C. and heat-treated at 80° C. to give a 45 Kim thick monoaxially drawn polyester film.

The obtained film showed an intrinsic viscosity of 0.73 dl/g, and the difference from the intrinsic viscosity (0.75 dl/g) of the chip mixture of polyester A and polyester B used as a film starting material was 0.02 dl/g. In other words, a decrease in the molecular weight of polyester was small. The film showed a breaking rate (mechanical strength) of 0% and a haze of 5.9%, which were both fine. In addition, the composition of the polymer constituting the film did not show changes during the period of from the start of the film production to the completion of the film production, and was the same as the object polymer composition calculated from the compositions of polyester A and polyester B and mixing ratio thereof.

EXAMPLE 2

High purity terephthalic acid (100 parts by weight), ethylene glycol (51.0 parts by weight), 1,4-cyclohexanedimethanol (27.8 parts by weight), diethylene glycol (1.0 part by weight) and sodium acetate in a proportion of 0.010 mol % of the resulting polyester were charged in a batch type polymerization apparatus. After nitrogen substitution, the mixture was heated to 240° C. over 30 min under a nitrogen atmosphere under pressurization at 0.25 MPa. The mixture was retained at 240° C. for 3 hr to perform an esterification reaction, after which 0.0225 mol % of antimony trioxide, 0.117 mol % of magnesium acetate 4 hydrate and 0.035 mol % of trimethyl phosphate, relative to the resulting polyester, were added. Then, the reaction system was depressurized to not more than 1.5 hPa over 75 min, and temperature rising was simultaneously started to ultimately reach 280° C. to conduct a polymerization reaction. Polymerization was completed in 60 min after the start of the depressurization. For extraction of the molten polymer, the system was maintained at 5-15 hPa and the polymer was extracted in strands from a die nozzle over 40 min, cooled with water in a cooling bath and palletized with a cutter to give a chip.

The chip (3000 kg) was fed into a 10 m$^3$ dryer and dried in vacuo at 6 rpm, 60° C. in 150 Pa. After 72 hours, the vacuum was broken and the chip was taken out. In so doing, fine particles were removed using a fine particle removing apparatus. This was used as polyester (chip) C.

The obtained polyester C had an intrinsic viscosity of 0.75 dl/g, a composition of terephthalic acid//ethylene glycol/1,4-cyclohexanedimethanol/diethylene glycol=100//66.0/30.5/3.5 (molar ratio) and was non-crystalline. Polyester C had a moisture content of 20 ppm, a fine particle content of 52 ppm, a crude by-product content of 0.05 wt %, a glass transition temperature of 83° C. and a terminal carboxyl group concentration of 24 eq/ton.

In the same manner as in the aforementioned production of polyester C except that ethylene glycol was used in a proportion of 56.0 parts by weight and neopentyl glycol was charged instead of 1,4-cyclohexanedimethanol in a proportion of 40.0 mol % relative to the entire glycol, polymerization, pelletization (chip formation), drying and removal of fine particles were performed. This was used as polyester (chip) D.

The obtained polyester D had an intrinsic viscosity of 0.75 dl/g, a composition of terephthalic acid//ethylene glycol/neopentyl glycol/diethylene glycol=100//67.0/30.0/3.0 (molar ratio) and was non-crystalline. Polyester D had a moisture content of 35 ppm, a fine particle content of 45 ppm, a crude by-product content of 0.10 wt %, a glass transition temperature of 79° C. and a terminal carboxyl group concentration of 28 eq/ton.

The above-mentioned two kinds of polyester (polyester C and polyester D) chips were mixed at a ratio of polyester C/polyester D (weight ratio) of 70/30 and a monoaxially drawn polyester film was obtained in the same manner as in Example 1.

The obtained film showed an intrinsic viscosity of 0.71 dl/g, and the difference from the intrinsic viscosity (0.75 dl/g) of the chip mixture of polyester C and polyester D used as a film starting material was 0.04 dl/g. In other words, a decrease in the molecular weight of polyester was small. The film showed a breaking rate (mechanical strength) of 0% and a haze of 5.9%, which were both fine. In addition, the composition of the polymer constituting the film did not show changes during the period of from the start of the film production to the completion of the film production, and was the same as the object polymer composition calculated from the compositions of polyester C and polyester D and mixing ratio thereof.

COMPARATIVE EXAMPLE 1

In the production of polyester A and polyester B chips in Example 1, the chips obtained by pelletization after melt polycondensation were not dried and used as final chips. These chips were used as polyester A1 and polyester B1. The polyester A1 chip had a moisture content of 2500 ppm, a fine particle content of 25 ppm, and a crude by-product content of 0.10 wt %. The polyester B1 chip had a moisture content of 2400 ppm, a fine particle content of 15 ppm and a crude by-product content of 0.15 wt %.

Then, a monoaxially drawn polyester film was obtained using these chips (polyester A1 and polyester B1) as film starting materials at a similar mixing ratio and under similar conditions as in Example 1.

The obtained film showed an intrinsic viscosity of 0.60 dl/g, and the difference from the intrinsic viscosity (0.75 dl/g) of the chip mixture of polyester A1 and polyester B1 used as a film starting material was 0.15 dl/g. In other words, the molecular weight of polyester decreased markedly. While the film showed a haze of 5.9% and fine, breaking rate (mechanical strength) was 20%, and a sufficiently strong film could not be obtained. In addition, the composition of the polymer constituting the film did not show changes during the period of from the start of the film production to the completion of the film production, and was the same as the object polymer composition calculated from the compositions of polyester A1 and polyester B1 and mixing ratio thereof.

COMPARATIVE EXAMPLE 2

In the production of polyester C and polyester D chips in Example 2, the chips obtained by pelletization after melt polycondensation were dried and used as final chips without removing fine particles by a fine particle removing apparatus. These chips were used as polyester C1 and polyester D1. The polyester C1 chip had a moisture content of 20 ppm, a fine particle content of 1500 ppm, and a crude by-product content of 0.10 wt %. On the other hand, the polyester D1 chip had a moisture content of 20 ppm, a fine particle content of 900 ppm and a crude by-product content of 0.15 wt %.

Then, a monoaxially drawn polyester film was obtained using these chips (polyester C1 and polyester D1) as film starting materials at a similar mixing ratio and under similar conditions as in Example 1.

The obtained film showed an intrinsic viscosity of 0.71 dl/g, and the difference from the intrinsic viscosity (0.75 dl/g) of the chip mixture of polyester C1 and polyester D1 used as a film starting material was 0.04 dl/g. In other words, the decrease in the molecular weight of polyester was small. While the film showed a breaking rate (mechanical strength) of 0%, the haze was as high as 8.5%.

In addition, the composition of the polymer constituting the film changed markedly as compared to the object polymer composition calculated from the compositions of polyester C1 and polyester D1 and mixing ratio thereof, during the period of from the start of the film production to the completion of the film production. Specifically, the composition (molar ratio) of CHDM and NPG in the obtained film in fact changed in the range of CHDM/NPG=24.4/6.0 to 18.3/12.0 against the object CHDM/NPG=21.4/9.0, during the period of from the start of the film production to the completion of the film production. It is known therefrom that a mixing ratio (weight ratio) of polyester C1 and polyester D1 changed in the range of 80/20 to 60/40 against the object (initial) 70/30, during the period of from the start of the film production to the completion of the film production.

EXAMPLE 3

Polyester chips (1 ton, polyester A, polyester B) produced in the above-mentioned Example 1 were respectively housed in a 1.5 m³N moisture-proof container made of polyethylene (PE) layer/aluminum (AL) layer/polyethylene (PE) layer without allowing contact with outside air by connecting a stainless pipe from an outlet of a fluidized bed type drying apparatus or a dryer directly into a moisture-proof container, and sealed by closing the inlet with a string. The chips were preserved for 2 months under the environment of temperature 250C., humidity 60%. After preservation, the moisture-proof container was opened and moisture contents of polyester A and polyester B were measured. The moisture increase (moisture content after preservation/moisture content before preservation) of polyester A and polyester B after preservation was not more than 1.5% for the both.

Polyester chips (polyester C, polyester D) produced in Example 2 were also housed in a moisture-proof container in the same manner, sealed by closing the inlet with a string, and preserved for 2 months under the environment of temperature 25° C., humidity 60%. After preservation, the moisture-proof container was opened and moisture contents of polyester C and polyester D were measured. The moisture increase (moisture content after preservation/moisture content before preservation) of polyester C and polyester D after preservation was not more than 1.5% for the both.

COMPARATIVE EXAMPLE 3

In the same manner as in Example 1 except that the temperature of dry gas was set to 75° C. when drying polyester A and polyester B, polyester (chip) A2 and polyester (chip) B2 were produced. The obtained polyester (chip) A2 and polyester (chip) B2 both contained a crude by-product in a proportion of 15 wt %. Using the polyester (chip) A2 and polyester (chip) B2 as film starting materials, production of a film was tried at a similar mixing ratio and production conditions as in Example 1. However, chips clogged at a chip outlet of a hopper used for mixing and feeding the chips to an extruder and stable production of the film was not attainable.

EXAMPLE 4

A continuous type polymerization equipment was used.

A slurry having a composition ratio of high purity terephthalic acid (TPA), ethylene glycol (EG), 1,4-cyclohexanedimethanol (CHDM) and diethylene glycol (DEG) of TPA//EG/CHDM/DEG=100//80/19/1 (molar ratio) was continuously fed into a first esterification reactor wherein a reaction product remained. Furthermore, esterification reaction was carried out with stirring at 250° C., 0.05 MPa to make the average residence time 3 hours.

The reaction product was transferred to a second esterification reactor and subjected to esterification reaction with stirring at 260° C., 0.05 MPa to make the average residence time 1 hour. This reaction product was transferred to a third esterification reactor and subjected to esterification reaction with stirring at 260° C., 0.05 MPa until a predetermined esterification rate was achieved to give an oligomer. The obtained oligomer showed a terminal carboxyl group concentration (AVo) of 300 eq/ton and a terminal hydroxyl group concentration (OHVo) of 1000 eq/ton.

To this oligomer were added continuously to achieve 0.0225 mol % of antimony trioxide in a 12 g/L EG solution, 0.117 mol % of magnesium acetate 4 hydrate in a 50 g/L EG solution, 0.010 mol % of sodium acetate in a 10 g/L ethylene glycol solution, and 0.035 mol % of trimethyl phosphate in a 65 g/L ethylene glycol solution, relative to the resulting polyester, by separately adding to a third esterification reactor. The product resulting from the esterification reaction was continuously fed to the first polycondensation reactor to conduct polycondensation with stirring at 265° C., 35 hPa for 1 hour, then in the second polycondensation reactor with stirring at 270° C., 5 hPa for 1 hour, and further in the final polycondensation reactor with stirring at 280° C., 0.5 to 1.5 hPa for 1 hour. The obtained polyester in a molten state was pelletized in the same manner as in Example 1 and the chip was dried under similar conditions. This is used as polyester E.

The obtained polyester E had an intrinsic viscosity of 0.75 dl/g, a composition of TPA//EG/CHDM/DEG=100//66.3/30.5/3.2 (molar ratio) and was non-crystalline. The content of each compound relative to polyester E was 0.0225 mol % for Sb compound, 0.117 mol % for Mg compound, 0.010 mol % for Na compound and 0.035 mol % for P compound. Furthermore, the obtained polyester chip had a moisture content of 20 ppm, a fine particle content of 30 ppm, and a crude by-product content of 0.1 wt %.

The melt specific resistance of polyester E at 275°C. was $0.20 \times 10^8$ Ω·cm. The maximum casting speed to be an index for electrostatic adhesion in production of a non-drawn sheet was 60 m/min.

After continuous operation under the above-mentioned reaction conditions for 3 days, 20 ton of polyester was produced per day, and intrinsic viscosity and amount of diethylene glycol component (copolymerization amount) of polyester produced were measured every 2 hours. As a result, IV range of variation (maximum value-minimum value) per day (20 ton) was found to be 0.023 dl/g, and the range of variation (maximum value-minimum value) of the amount of the diethylene glycol component (copolymerization amount) was 0.15 mol %.

Then, according to a conventional method, the polyester was melt-extruded at 280° C., cast at a casting speed of 60 m/min, stretched 4 times in the transverse direction at 80° C. and heat-treated at 80° C. to give a 45 μm thick film. The obtained film showed fine solvent adhesiveness, superior transparency (haze of 4.5%), and superior thickness uniformity (thickness dispersion of 4%).

The aforementioned polyester E chip and polyester B chip obtained in Example 1 were mixed to achieve polyester E/polyester B (weight ratio) of 70/30 and melt-extruded under the same conditions as in Example 1 to give a 45 μm-thick film.

The obtained film showed an intrinsic viscosity of 0.71 dl/g, and the difference from the intrinsic viscosity (0.75 dl/g) of the chip mixture of polyester E and polyester B used as a film starting material was 0.04 dl/g. In other words, a decrease in the molecular weight of polyester was small. The film showed a breaking rate (mechanical strength) of 0% and a haze of 3.5%, which were both fine. In addition, the composition of the polymer constituting the film did not show changes during the period of from the start of the film production to the completion of the film production, and was the same as the object polymer composition calculated from the compositions of polyester E and polyester B and mixing ratio thereof.

EXAMPLE 5

High purity terephthalic acid (100 parts by weight), ethylene glycol (51.0 parts by weight), 1,4-cyclohexanedimethanol (27.8 parts by weight), diethylene glycol (1.0 part by weight) and sodium acetate (0.010 mol %) relative to the resulting polyester were charged in a batch type polymerization apparatus. After nitrogen substitution, the mixture was heated to 240° C. over 30 min under a nitrogen atmosphere under pressurization at 0.25 MPa. The mixture was retained at 240° C. for 3 hours to perform an esterification reaction, after which 0.025 mol % of antimony trioxide, 0.118 mol % of magnesium acetate 4 hydrate and 0.045 mol % of trimethyl phosphate, relative to the resulting polyester, were added to the reactor. Then, the inside of the polymerization reaction system was depressurized to not more than 1.5 hPa over 75 min, and temperature rising was simultaneously started to ultimately reach 280° C. to conduct a polymerization reaction. Polymerization was completed in 60 min after the start of the depressurization. For extraction of the molten polymer, the system was maintained at 5 to 15 hPa and the polymer was extracted in strands from a die nozzle over 40 min, cooled with water in a cooling bath filled with water and pelletized with a cutter to give a chip. Then, the obtained polyester chip was dried under similar conditions as in Example 1. This was used as polyester F.

The obtained polyester F had a moisture content of 33 ppm, a fine particle content of 55 ppm, and a crude by-product content of 0.12 wt %. The polyester F had a composition of TPA//EG/CHDM/DEG=100//65.5/30.8/3.7 (molar ratio) and was non-crystalline. Furthermore, the intrinsic viscosity of the polyester was 0.755 dl/g on start of the extraction of the polyester in a molten state from a polycondensation reactor and 0.750 dl/g after progress of 40 min from the extraction. In other words, time course changes (range of variation) in the intrinsic viscosity of polyester during extraction of polyester in a molten state from a polycondensation reactor were small. The content of each compound relative to polyester was 0.025 mol % for Sb compound, 0.115 mol % for Mg compound, 0.011 mol % for Na compound and 0.045 mol % for P compound.

When polyester (700 kg) was produced in the same manner as above, range of variation (maximum value-minimum value) in the intrinsic viscosity of polyester during extraction of polyester in a molten state from a polycondensation reactor was 0.015 dl/g.

The melt specific resistance of the obtained polyester F was $0.228 \times 10^8$ Ω·cm. The maximum casting speed to be an index for electrostatic adhesion in production of a non-drawn sheet was 58 m/min.

Then, in the same manner as in Example 1 except that the casting speed was 58 m/min, a 45 pmj thick film was obtained. The obtained film had fine solvent adhesiveness, and was superior in transparency (haze of 4.5%) and thickness uniformity (thickness dispersion of 5%).

The aforementioned polyester F chip and polyester B chip obtained in Example 1 were mixed at polyester F/polyester B (weight ratio) of 70/30, and in the same manner as in Example 1, a 45 µm thick film was obtained. The obtained film had an intrinsic viscosity of 0.72 dl/g, and the difference from the intrinsic viscosity (0.75 dl/g) of the chip mixture of polyester F and polyester B used as a film starting material was 0.03 dl/g. In other words, a decrease in the molecular weight of polyester was small. The film showed a breaking rate (mechanical strength) of 0.2% and a haze of 6.0%, which were both fine. In addition, the composition of the polymer constituting the film did not show changes during the period of from the start of the film production to the completion of the film production, and was the same as the object polymer composition calculated from the compositions of polyester F and polyester B and mixing ratio thereof.

EXAMPLE 6

In the same manner as in Example 4 except that the aforementioned monomer slurry having a composition ratio of high purity terephthalic acid (TPA), ethylene glycol (EG) and 1,4-cyclohexanedimethanol (CHDM) of TPA//EG/CHDM=100//68.0/32.0 (molar ratio) was used in the first esterification reactor, polyester G chip was produced.

The obtained polyester G had a composition of TPA//EG/CHDM/DEG=100//68.7/30.5/0.8 (molar ratio) and was non-crystalline. The intrinsic viscosity was 0.75 dl/g.

By processing the aforementioned polyester G chip in the same manner as in Example 4, a 45 µm thick film was obtained. The obtained film had a haze of 4.5% and was fine but inferior in solvent adhesiveness.

EXAMPLE 7

In the same manner as in Example 5 except that diethylene glycol was not used as a starting material monomer, polyester H chip was produced.

The obtained polyester H had a composition of TPA//EG/CHDM/DEG=100//68.0/30.5/1.3 (molar ratio) and was non-crystalline. When polyester in a molten state was extracted from a polycondensation reactor, the intrinsic viscosity when extraction was started was 0.745 dl/g.

By processing the aforementioned polyester H chip in the same manner as in Example 5, a 45 µm thick film was obtained. The obtained film had a haze of 4.6% and was fine but inferior in solvent adhesiveness.

EXAMPLE 8

In the same manner as in Example 5 except that the pressure in the reactor during extraction was changed to 0.2 MPa when polyester in a molten state was extracted from a polycondensation reactor, polyester I chip was produced.

The composition of the obtained polyester I was the same as that of polyester F obtained in Example 5. Furthermore, the intrinsic viscosity of the polyester was 0.75 dl/g on start of the extraction of the polyester in a molten state from a polycondensation reactor and 0.68 dl/g after progress of 40 min from the extraction and time-course changes in the intrinsic viscosity was high.

In the same manner as in Example 5, a 45 µm thick film was obtained from a polyester chip having an intrinsic viscosity of 0.75 dl/g on start of the extraction. The obtained film had a haze of 4.0% and was superior in transparency. In addition, it was superior in solvent adhesiveness.

EXAMPLE 9

In the same manner as in Example 4 except that magnesium acetate 4 hydrate, sodium acetate and trimethyl phosphate were not fed, a polyester J chip was produced.

Polyester J had almost the same polymer composition as in Example 4 but its melt specific resistance was as high as $2.53 \times 10^8$ Ω·cm. The maximum casting speed to be an index for electrostatic adhesion in production of a non-drawn sheet using this polyester J was 15 m/min.

Then, in the same manner as in Example 4 except that the casting speed was changed to 10 m/min, a 45 µm thick film was obtained. The obtained film was superior in transparency (haze of 3.8%), had fine solvent adhesiveness, and was superior in thickness uniformity (thickness dispersion of 4%).

EXAMPLE 10

A continuous type polymerization equipment was used.

A slurry adjusted to contain 100 mol % of high purity terephthalic acid (TPA) as a dicarboxylic acid component, and 83 mol % of ethylene glycol (EG) and 17 mol % of neopentyl glycol (NPG) as a glycol component, wherein a molar ratio (G/A) of the entire glycol component relative to the dicarboxylic acid component was adjusted to 2.0, was continuously fed to the first esterification reactor containing a remaining reaction product, in such a manner that the production amount of the resulting polyester was 1 ton/h. Furthermore, a 12 g/L solution of antimony trioxide in ethylene glycol was continuously fed to the first esterification reactor, so that antimony trioxide could be 0.025 mol % relative to the resulting polyester. Then, esterification reaction was carried out with stirring under the conditions of reactor internal pressure 0.05 MPa, 250° C., to make the average residence time 3 hours.

The reaction product was transferred to a second esterification reactor and subjected to esterification reaction with stirring at 260° C., reactor internal pressure of 0.05 MPa to make the average residence time 1 hour. This reaction product was transferred to a third esterification reactor and subjected to esterification reaction with stirring at 260° C., reactor internal pressure of 0.05 MPa until a predetermined esterification rate was achieved.

The oligomer obtained after esterification reaction had a terminal carboxyl group concentration (Avo) of 380 eq/ton. To this oligomer in the third esterification reactor were continuously fed from separate supply openings a 50 g/L EG solution of magnesium acetate 4 hydrate, a 65 g/L EG solution of trimethyl phosphate, a 10 g/L EG solution of sodium acetate, and a 50 g/L EG solution of cobalt acetate 4 hydrate, relative to the resulting polyester, so that Mg amount (M2) would be 0.17 mol %, P amount (P) would be 0.079 mol % (M2/P molar ratio of 2.2), Na amount would be 0.018 mol %, and Co amount would be 0.0035 mol %.

The product resulting from the esterification reaction was continuously fed to the first polycondensation reactor to conduct polycondensation with stirring at 265° C., 35 hPa for 1 hour, then in the second polycondensation reactor with for 1 hour. After the polycondensation reaction, polyester in a molten state was passed through a stainless long fiber tubular polymer filter with a leaf having a filtration precision of not less than 95% at 60 μm. Then, a polyester in a molten state was extracted in strands from a die nozzle, cooled with water in a cooling bath, and cut into a chip. The obtained chip was dried under similar conditions as in Example 1 to give a polyester K chip.

The obtained polyester K chip had a moisture content of 39 ppm, a fine particle content of 22 ppm, and a crude by-product content of 0.19 wt %. The polyester K had an intrinsic viscosity of 0.74 dl/g, a composition of TPA//EG/NPG/DEG=100//66.5/31.0/2.5 (molar ratio) and was non-crystalline. In the aforementioned polyester K composition, DEG (diethylene glycol) was a by-product occurred during the reaction. The composition of the catalyst and additive in polyester K was Sb/Mg/P/Na/Co=0.0245/0.170/0.079/0.018/0.0035 (mol %) relative to polyester K and the Mg/P molar ratio (M/P) was 2.2. The polyester K had a melt specific resistance (ρi) foreign substances of not less than 10 μm. In other words, it was a clean amorphous polyester superior in electrostatic adhesion and having less foreign substances.

Then the polyester K chip was melt-extruded from a T-die into a sheet, closely adhered to and solidified on a rotary cooling metal roll while applying static electricity to give a non-drawn sheet. The casting speed then was 62 m/min. The number of defects per 1 m² of the film after biaxially drawing was 0 and fine (rank: ☉) and the formability was also fine (rank: ☉).

In addition, the aforementioned polyester K chip and polyester A chip obtained in Example 1 were mixed to make polyester A/polyester K (weight ratio) 70/30, and in the same manner as in Example 1, a 45 μm thick film was obtained.

The obtained film showed an intrinsic viscosity of 0.72 dl/g, and the difference from the intrinsic viscosity (0.75 dl/g) of the chip mixture of polyester A and polyester K used as a film starting material was 0.03 dl/g. In other words, a decrease in the molecular weight of polyester was small. The film showed a breaking rate (mechanical strength) of 0.7% and a haze of 3.9%, which were both acceptable. In addition, the composition of the polymer constituting the film did not show changes from the start of the film production to the completion of the film production, and was the same as the object polymer composition calculated from the compositions of polyester A and polyester K and mixing ratio thereof.

EXAMPLE 11

A batch type polymerization equipment was used.

Dimethylterephthalate (DMT) (100 parts by weight), ethylene glycol (EG) (53.1 parts by weight) and neopentyl glycol (NPG) (18.2 parts by weight) were fed into a 2.5 m³ esterification reaction tank having a stirrer and a distillation condenser, manganese acetate 4 hydrate as a catalyst was added in a proportion of 0.020 mol % relative to the resulting polyester and antimony trioxide was added in a proportion of 0.026 mol % relative to the resulting polyester. Then, the reaction system was gradually heated to finally reach 240° C. with stirring, and transesterification reaction was carried out at a pressure of 0.25 MPa for 180 min. After confirmation of termination of distilled water from the reaction system, the reaction system was returned to the atmospheric pressure and magnesium acetate 4 hydrate was added in a proportion of 0.17 mol %, trimethyl phosphate was added in a proportion of 0.08 mol % and sodium acetate was added in a proportion of 0.022 mol %, relative to the resulting polyester. The terminal carboxyl group concentration then of the oligomer was 10 eq/ton.

The obtained oligomer was transferred to a 2 m³ polycondensation reactor with a stirrer and a distillation condenser. Then, temperature rising and reduction of pressure were repeated in steps with stirring to finally control to reach a temperature of 280° C. and a pressure of 0.2 hPa. The reaction was carried out until the intrinsic viscosity reached a desired level, when the polycondensation reaction was completed. The reaction time was 170 min.

After the polycondensation reaction, polyester in a molten state was passed through a stainless long fiber tubular polymer filter with a leaf having a filtration precision of not less than 95% at 30 μm. Then, a polyester in a molten state was extracted in strands from a die nozzle, cooled with water in a cooling bath, and cut into a chip. The obtained chip was dried under similar conditions as in Example 1 to give a polyester L chip.

The obtained polyester L chip had a moisture content of 35 ppm, a fine particle content of 44 ppm, and a crude by-product content of 0.09 wt %. The polyester L had an intrinsic viscosity of 0.729 dl/g, a composition of TPA//EG/NPG/DEG=100//67.6/29.2/3.2 (mol %) and was non-crystalline. In the aforementioned polyester L composition, DEG (diethylene glycol) was a by-product occurred during the reaction. The content of the catalyst and additive in the polyester was Sb/Mg/P/Na/Co=0.0260/0.170/0.080/0.022/0.0035 (mol %) relative to polyester and the Mg/P molar ratio (M2/P) was 2.13. The polyester L had a melt specific resistance (βi) foreign substances of not less than 10 μm. In other words, the aforementioned polyester was a clean polymer superior in electrostatic adhesion and containing less foreign substances.

Then the obtained polyester L chip was melt-extruded from a T-die into a sheet, closely adhered to and solidified on a rotary cooling metal roll while applying static electricity to give a non-drawn sheet. The casting speed then was 60 m/min. The number of defects per 1 m² of the film after biaxially drawing was 0 and fine (rank: ☉) and the formability was also fine (rank: ☉).

In addition, the aforementioned polyester L chip and polyester A chip obtained in Example 1 were mixed to make polyester A/polyester L (weight ratio) 70/30, and in the same manner as in Example 1, a 45 μm thick film was obtained.

The obtained film showed an intrinsic viscosity of 0.72 dl/g, and the difference from the intrinsic viscosity (0.74 dl/g) of the chip mixture of polyester A and polyester L used as a film starting material was 0.02 dl/g. In other words, a decrease in the molecular weight of polyester was small. The film showed a breaking rate (mechanical strength) of 0.8% and a haze of 4.5%, which were both fine. In addition, the composition of the polymer constituting the film did not show changes during the period of from the start of the film production to the completion of the film production, and was the same as the object polymer composition calculated from the compositions of polyester A and polyester L and mixing ratio thereof.

EXAMPLE 12

A continuous type polymerization equipment was used.

A slurry having a composition of high purity terephthalic acid (TPA), ethylene glycol (EG) and 1,4-ratio) was continuously fed to the first esterification reactor containing a remaining reaction product and esterification reaction was conducted with stirring under the conditions of 250° C., 0.05 MPa in such a manner that the average residence time became 3 hours. This reaction product was transferred to the second esterification reactor, and esterification reaction was conducted with stirring under the conditions of 260° C., pressure 0.05 MPa in such a manner that the average residence time became 1 hour. This reaction product was transferred to the third esterification reactor, and esterification reaction was conducted with stirring under the conditions of 260° C., 0.05 MPa until a predetermined esterification rate was achieved.

The oligomer obtained after the esterification reaction had a terminal carboxyl group concentration (AVo) of 380 eq/ton. To this oligomer in the third esterification reactor were continuously fed from separate supply openings a 12 g/L ethylene glycol solution of antimony trioxide, a 50 g/L ethylene glycol solution of magnesium acetate 4 hydrate, and a 65 g/L ethylene glycol solution of trimethyl phosphate, so that (1) antimony trioxide would be 0.02 mol %, (2) magnesium acetate 4 hydrate would be 0.015 mol %, and (3) trimethyl phosphate would be 0.015 mol %, relative to the resulting polyester.

The product resulting from the esterification reaction was continuously fed to the first polycondensation reactor to conduct polycondensation with stirring at 265° C., 35 hPa for 1 hour, then in the second polycondensation reactor with stirring at 270° C., 5 hPa for 1 hour, and further in the final polycondensation reactor with stirring at 280° C., 0.5 to 1.5 hPa for 1 hour. The obtained polyester was pelletized and dried in the same manner as in Example 1. The obtained polyester M chip had a moisture content of 32 ppm, a fine particle content of 33 ppm, and a crude by-product content of 0.12 wt %.

The polyester M had an intrinsic viscosity of 0.78 dl/g, a composition of TPA//EG/CHDM/DEG=100//68.5/30.5/1.0 (mol %) and was non-crystalline. In the aforementioned polyester M composition, DEG (diethylene glycol) was a by-product occurred during the reaction. The composition of the catalyst and additive in polyester M was Sb/Mg/P=0.0195/0.0150/0.0145 (mol %) and the Mg/P molar ratio (M2/P) was 1.03.

Polyester M had a color L value of 55, a color b value of 1.2 and was superior in color tone. Using polyester M, injection molding was performed to give a 5 mm-thick formed plate. This formed plate had a haze of 1.2% and was superior in transparency.

In addition, the aforementioned polyester M chip and polyester B chip obtained in Example 1 were mixed to make polyester M/polyester B (weight ratio) 70/30, and in the same manner as in Example 1, a 45 μm thick film was obtained.

The obtained film showed an intrinsic viscosity of 0.74 dl/g, and the difference from the intrinsic viscosity (0.77 dl/g) of the chip mixture of polyester M and polyester B used as a film starting material was 0.03 dl/g. In other words, a decrease in the molecular weight of polyester was small. The film showed a breaking rate (mechanical strength) of 0.1% and a haze of 5.0%, which were both fine. In addition, the composition of the polymer constituting the film did not show changes during the period of from the start of the film production to the completion of the film production, and was the same as the object polymer composition calculated from the compositions of polyester M and polyester B and mixing ratio thereof.

EXAMPLE 13

A continuous type polymerization equipment was used.

A slurry having a composition of high purity terephthalic acid (TPA), ethylene glycol (EG) and 1,4-cyclohexanedimethanol (CHDM) adjusted to 100//80/20 (molar ratio) was continuously fed to the first esterification reactor containing a remaining reaction product and esterification reaction was conducted with stirring under the conditions of 250° C., 0.05 MPa in such a manner that the average residence time became 3 hours. This reaction product was transferred to the second esterification reactor, and esterification reaction was conducted with stirring under the conditions of 260° C., 0.05 MPa in such a manner that the average residence time became 1 hour. This reaction product was transferred to the third esterification reactor, and esterification reaction was conducted with stirring under the conditions of 260° C., 0.05 MPa until a predetermined esterification rate was achieved.

The oligomer obtained after the esterification reaction had a terminal carboxyl group concentration (AVo) of 380 eq/ton. To this oligomer in the third esterification reactor were continuously fed from separate supply openings a 8 g/L aqueous solution of germanium dioxide, a 50 g/L EG solution of magnesium acetate 4 hydrate, and a 65 g/L EG solution of trimethyl phosphate, so that (1) germanium dioxide would be 0.015 mol %, (2) magnesium acetate 4 hydrate would be 0.015 mol %, and (3) trimethyl phosphate would be 0.030 mol %, relative to the resulting polyester.

The product resulting from the esterification reaction was continuously fed to the first polycondensation reactor to conduct polycondensation with stirring at 265° C., 35 hPa for 1 hour, then in the second polycondensation reactor with stirring at 270° C., 5 hPa for 1 hour, and further in the final polycondensation reactor with stirring at 280° C., 0.5 to 1.5 hPa for 1 hour. The obtained polyester was pelletized and dried in the same manner as in Example 1. The obtained polyester N chip had a moisture content of 35 ppm, a fine particle content of 30 ppm, and a crude by-product content of 0.1 wt %.

The polyester N had an intrinsic viscosity of 0.78 dl/g, a composition of TPA//EG/CHDM/DEG=100//68.5/30.5/1.0 (molar ratio) and was non-crystalline. In the aforementioned polyester N composition, DEG (diethylene glycol) was a by-product occurred during the reaction. The composition of the catalyst and additive in polyester N was Ge/Mg/P=0.0150/0.0150/0.029 (mol % ratio) and the (Mg+Ge)/P molar ratio was 1.03. Polyester N had a color L value of 63, a color b value of −1.0 and was superior in color tone. Using the obtained polyester N, injection molding was performed to give a 5 mm-thick formed plate. This formed plate had a haze of 1.0% and was superior in transparency.

In addition, the aforementioned polyester N chip and polyester B chip obtained in Example 1 were mixed to make polyester N/polyester B (weight ratio) 70/30, and extrusion-formed under the same conditions as in Example 1 to form a 45 μm thick film.

The obtained film showed an intrinsic viscosity of 0.75 dl/g, and the difference from the intrinsic viscosity (0.77 dl/g) of the chip mixture of polyester N and polyester B used as a film starting material was 0.02 dl/g. In other words, a decrease in the molecular weight of polyester was small. The film showed a breaking rate (mechanical strength) of 0.3% and a haze of 4.9%, which were both fine. In addition, the composition of the polymer constituting the film did not show changes during the period of from the start of the film production to the completion of the film production, and was the same as the object polymer composition calculated from the compositions of polyester N and polyester B and mixing ratio thereof.

EXAMPLE 14

A continuous type polymerization equipment was used.

A slurry having a composition of high purity terephthalic acid (TPA), ethylene glycol (EG) and 1,4-cyclohexanedimethanol (CHDM) adjusted to 100//80/20 (molar ratio) was continuously fed to the first esterification reactor containing a remaining reaction product. Furthermore, a 250 g/L n-butanol solution of titanium tetrabutoxide was continuously fed from a separate supply opening, so that titanium tetrabutoxide would be 0.007 mol % relative to the resulting polyester, and an esterification reaction was conducted with stirring under the conditions of 250° C., 0.05 MPa in such a manner that the average residence time became 3 hours. This reaction product was transferred to the second esterification reactor, and esterification reaction was conducted with stirring under the conditions of 260° C., 0.05 MPa in such a manner that the average residence time became 1 hour. This reaction product was transferred to the third esterification reactor, and esterification reaction was conducted with stirring under the conditions of 260° C., 0.05 MPa until a predetermined esterification rate was achieved.

The oligomer obtained after the esterification reaction had a terminal carboxyl group concentration (AVo) of 380 eq/ton and a terminal hydroxyl group concentration (OHVo) of 1200 eq/ton. To this oligomer in the third esterification reactor were continuously fed from separate supply openings a 50 g/L EG solution of magnesium acetate 4 hydrate, a 65 g/L EG solution of trimethyl phosphate, and a 50 g/L EG solution of cobalt acetate, so that (1) magnesium acetate 4 hydrate would be 0.015 mol %, (2) trimethyl phosphate would be 0.015 mol %, and (3) cobalt acetate would be 0.015 mol % relative to the resulting polyester.

The product resulting from the esterification reaction was continuously fed to the first polycondensation reactor to conduct polycondensation with stirring at 265° C., 35 hPa for 1 hour, then in the second polycondensation reactor with stirring at 270° C., 5 hPa for 1 hour, and further in the final polycondensation reactor with stirring at 280° C., 0.5 to 1.5 hPa for 1 hour. The obtained polyester was pelletized and dried in the same manner as in Example 1. The obtained polyester O chip had a moisture content of 30 ppm, a fine particle content of 35 ppm, and a crude by-product content of 0.1 wt %.

The obtained polyester O had an intrinsic viscosity of 0.78 dl/g, a composition of TPA//EG/CHDM/DEG=100//68.5/30.5/1.0 (molar ratio) and was non-crystalline. In the polyester O composition, DEG (diethylene glycol) was a by-product occurred during the reaction. The composition of the catalyst and additive in polyester O was Ti/Mg/P/Co=0.007/0.015/0.015/0.015 (mol %) and the Mg/P molar ratio (M2/P) was 1.00.

Polyester O had a color L value of 58, a color b value of 2.5 and was superior in color tone. Using the polyester O, injection molding was performed to give a 5 mm-thick formed plate. This formed plate had a haze of 1.2% and was superior in transparency.

In addition, the aforementioned polyester O chip and polyester B chip obtained in Example 1 were mixed to make polyester O/polyester B (weight ratio) 70/30, and a 45 µm thick film was obtained in the same manner as in Example 1.

The obtained film showed an intrinsic viscosity of 0.75 dl/g, and the difference from the intrinsic viscosity (0.77 dl/g) of the chip mixture of polyester O and polyester B used as a film starting material was 0.02 dl/g. In other words, a decrease in the molecular weight of polyester was small. The film showed a breaking rate (mechanical strength) of 0.5% and a haze of 3.1%, which were both fine. In addition, the composition of the polymer constituting the film did not show changes during the period of from the start of the film production to the completion of the film production, and was the same as the object polymer composition calculated from the compositions of polyester O and polyester B and mixing ratio thereof.

EXAMPLE 15

A continuous type polymerization equipment was used.

A slurry having a composition of high purity terephthalic acid (TPA), ethylene glycol (EG) and 1,4-cyclohexanedimethanol (CHDM) adjusted to 100//80/20 (molar ratio) was continuously fed to the first esterification reactor containing a remaining reaction product and esterification reaction was conducted with stirring under the conditions of 250° C., 0.05 MPa in such a manner that the average residence time became 3 hours. This reaction product was transferred to the second esterification reactor, and esterification reaction was conducted with stirring under the conditions of 260° C., pressure 0.05 MPa in such a manner that the average residence time became 1 hour. This reaction product was transferred to the third esterification reactor, and esterification reaction was conducted with stirring under the conditions of 260° C., 0.05 MPa until a predetermined esterification rate was achieved.

The oligomer obtained after the esterification reaction had a terminal carboxyl group concentration of 380 eq/ton. To this oligomer in the third esterification reactor were continuously fed from separate supply openings a 12 g/L EG solution of antimony trioxide, a 50 g/L EG solution of zinc acetate dihydrate, and a 65 g/L EG solution of trimethyl phosphate, so that (1) antimony trioxide would be 0.02 mol %, (2) zinc acetate dihydrate would be 0.015 mol %, and (3) trimethyl phosphate would be 0.015 mol %, relative to the resulting polyester.

The product resulting from the esterification reaction was continuously fed to the first polycondensation reactor to conduct polycondensation with stirring at 265° C., 35 hPa for 1 hour, then in the second polycondensation reactor with stirring at 270° C., 5 hPa for 1 hour, and further in the final polycondensation reactor with stirring at 280° C., 0.5 to 1.5 hPa for 1 hour. The obtained polyester was pelletized and dried in the same manner as in Example 1. The obtained polyester P chip had a moisture content of 29 ppm, a fine particle content of 30 ppm, and a crude by-product content of 0.08 wt %.

The polyester P had an intrinsic viscosity of 0.78 dl/g, a composition of TPA//EG/CHDM/DEG=100//68.5/30.5/1.0 (molar ratio) and was non-crystalline. In the polyester P composition, DEG (diethylene glycol) was a by-product occurred during the reaction. The composition of the catalyst and additive in polyester P was Sb/Zn/P=0.0195/0.0150/0.0145 (mol %) and the Zn/P molar ratio (M2/P) was 1.03.

Polyester P had a color L value of 53, a color b value of −1.0 and was superior in color tone. Using the obtained polyester P, injection molding was performed to give a 5 mm-thick formed plate. This formed plate had a haze of 1.4% and was superior in transparency.

In addition, the aforementioned polyester P chip and polyester B chip obtained in Example 1 were mixed to make polyester P/polyester B (weight ratio) 70/30, and a 45 p thick film was obtained in the same manner as in Example 1.

The obtained film showed an intrinsic viscosity of 0.74 dl/g, and the difference from the intrinsic viscosity (0.77 dl/g) of the chip mixture of polyester P and polyester B used as a film starting material was 0.03 dl/g. In other words, a decrease in the molecular weight of polyester was small. The film showed a breaking rate (mechanical strength) of 0.9% and a haze of 6.0%, which were both fine. In addition, the composition of the polymer constituting the film did not show changes during the period of from the start of the film production to the completion of the film production, and was the same as the object polymer composition calculated from the compositions of polyester P and polyester B and mixing ratio thereof.

EXAMPLE 16

A continuous type polymerization equipment was used.

A slurry adjusted to contain 100 mol % of high purity terephthalic acid (TPA) as a dicarboxylic acid component, and 83 mol % of ethylene glycol (EG) and 17 mol % of neopentyl glycol (NPG) as a glycol component, and a molar ratio of the entire glycol component to the dicarboxylic acid component of 2.0 was continuously fed to the first esterification reactor containing a remaining reaction product in such a manner that the production amount of the resulting polyester became 1 ton/h.

To this polyester in the first esterification reactor were continuously fed a 250 g/L n-butanol solution of titanium tetrabutoxide, a 8 g/L aqueous solution of crystalline germanium dioxide, and a 50 g/L EG solution of cobalt acetate 4 hydrate, so that titanium tetrabutoxide would be contained at 3 ppm as titanium atom, crystalline germanium dioxide would be contained at 50 ppm as germanium atom and cobalt acetate 4 hydrate would be contained at 35 ppm as cobalt atom, relative to the resulting polyester, and the reaction was conducted with stirring under the conditions of pressure in the reactor 0.05 MPa, 250° C., in such a manner that the average residence time became 4 hours.

This reaction product was transferred to the second esterification reactor. Furthermore, a 65 g/L ethylene glycol solution of trimethyl phosphate was continuously fed to the second esterification reactor, so that trimethyl phosphate would be contained at 50 ppm as phosphorus atom, relative to the resulting polyester, and esterification reaction was conducted with stirring under the conditions of reactor internal pressure 0.05 MPa, 260° C. in such a manner that the average residence time became 2 hours.

The product resulting from the esterification reaction was continuously fed to the first polycondensation reactor to conduct polycondensation with stirring at 265° C., 35 hPa for 1 hour, then in the second polycondensation reactor with stirring at 270° C., 5 hPa for 1 hour, and further in the final polycondensation reactor with stirring at 280° C., 0.5 to 1.5 hPa for 1 hour. The obtained polyester was pelletized and dried in the same manner as in Example 1. The obtained polyester Q chip had a moisture content of 40 ppm, a fine particle content of 35 ppm, and a crude by-product content of 0.07 wt %.

The polyester Q had an intrinsic viscosity of 0.74 dl/g, a composition of TPA//EG/NPG/DEG=100//68/30/2 (mol %) and was non-crystalline. In the polyester Q composition, DEG (diethylene glycol) was a by-product occurred during the reaction. The contents of each atom derived from the catalyst and additive in polyester Q was Ti/Ge/Co/P=3/50/35/50 (ppm), (Ti/0.06+Ge/3.33) was 65, Ti/Co was 0.086 and (Co+Ge)/P was 1.7. The amount of the titanium compound (Ti(OC$_4$H$_9$)) was 0.0013 mol % and the amount of the germanium compound (GeO$_2$) was 0.014 mol %, relative to the polyester.

Polyester Q had a color L value of 55, a color b value of 0.2 and was superior in color tone.

Using the obtained polyester Q, injection molding was performed to give a 5 mm-thick formed plate. This formed plate had a haze of 0.7% and was highly superior in transparency.

In addition, the aforementioned polyester Q chip and polyester A chip obtained in Example 1 were mixed to make polyester A/polyester Q (weight ratio) 70/30, and a 45 thick film was obtained in the same manner as in Example 1.

The obtained film showed an intrinsic viscosity of 0.71 dl/g, and the difference from the intrinsic viscosity (0.75 dl/g) of the chip mixture of polyester A and polyester Q used as a film starting material was 0.04 dl/g. In other words, a decrease in the molecular weight of polyester was small. The film showed a breaking rate (mechanical strength) of 0.2% and a haze of 3.9%, which were both fine. In addition, the composition of the polymer constituting the film did not show changes during the period of from the start of the film production to the completion of the film production, and was the same as the object polymer composition calculated from the compositions of polyester A and polyester Q and mixing ratio thereof.

EXAMPLE 17

A continuous type polymerization equipment was used.

A slurry adjusted to contain 100 mol % of high purity terephthalic acid (TPA) as a dicarboxylic acid component, and 83 mol % of ethylene glycol (EG) and 17 mol % of neopentyl glycol (NPG) as a glycol component, and a molar ratio of the entire glycol component to the dicarboxylic acid component of 2.0 was continuously fed to the first esterification reactor containing a remaining reaction product in such a manner that the production amount of the resulting polyester became 1 ton/h.

To this polyester in the first esterification reactor were continuously fed a 12 g/L EG solution of antimony trioxide and a 0.8 g/L aqueous solution of crystalline germanium dioxide, so that 0.012 mol % of antimony trioxide and 0.006 mol % of crystalline germanium dioxide would be contained relative to the resulting polyester, and the esterification reaction was conducted with stirring under the conditions of pressure in the reactor 0.05 MPa, 250° C., in such a manner that the average residence time became 4 hours.

This reaction product was transferred to the second esterification reactor. Furthermore, a 65 g/L EG solution of trimethyl phosphate was continuously fed to the second esterification reactor, so that trimethyl phosphate would be contained at 0.021 mol %, relative to the resulting polyester, and the reaction was conducted with stirring under the conditions of reactor internal pressure 0.05 MPa, 260° C. in such a manner that the average residence time became 2 hours.

The obtained oligomer was continuously fed to the first polycondensation reactor to conduct polycondensation with stirring at 265° C., 35 hPa for 1 hour, then in the second polycondensation reactor with stirring at 270° C., 5 hPa for 1 hour, and further in the final polycondensation reactor with stirring at 280° C., 0.5 to 1.5 hPa for 1 hour. The obtained polyester was pelletized and dried in the same manner as in Example 1. The obtained polyester R chip had a moisture content of 30 ppm, a fine particle content of 30 ppm, and a crude by-product content of 0.08 wt %.

The polyester R had an intrinsic viscosity of 0.74 dl/g, a composition of TPA//EG/NPG/DEG=100//69/30/1 (mol %) and was non-crystalline. In the polyester R composition, DEG (diethylene glycol) was a by-product occurred during the reaction. The metal contents derived from the catalyst and additive in polyester R was Sb/Ge/P=135/20/30 (ppm), (Sb/ 3.90+Ge/1.67) was 47, and Ge/P was 0.7. The amount of the antimony compound ($Sb_2O_3$) was 0.0011 mol % and the amount of the germanium compound ($GeO_2$) was 0.0056 mol %, relative to the copolymerized polyester.

Polyester R had a color L value of 55, a color b value of 2.0 and was superior in color tone. Using the obtained polyester R, injection molding was performed to give a 5 mm-thick formed plate. This formed plate had a haze of 3.4% and was superior in transparency.

In addition, the aforementioned polyester R chip and polyester A chip obtained in Example 1 were mixed to make polyester A/polyester R (weight ratio) 70/30, and a 45 Mm thick film was obtained in the same manner as in Example 1.

The obtained film showed an intrinsic viscosity of 0.72 dl/g, and the difference from the intrinsic viscosity (0.75 dl/g) of the chip mixture of polyester A and polyester R used as a film starting material was 0.03 dl/g. In other words, a decrease in the molecular weight of polyester was small. The film showed a breaking rate (mechanical strength) of 0.1% and a haze of 2.8%, which were both fine. In addition, the composition of the polymer constituting the film did not show changes during the period of from the start of the film production to the completion of the film production, and was the same as the object polymer composition calculated from the compositions of polyester A and polyester R and mixing ratio thereof.

EXPERIMENTAL EXAMPLE 1

A continuous type polymerization equipment was used.

A slurry adjusted to contain 100 mol % of high purity terephthalic acid (TPA), and to have a molar ratio of ethylene glycol (EG) and 1,4-cyclohexanedimethanol (CHDM) of 80/20 and a molar ratio (G/A) of the total amount (G) of EG and CHDM, and TPA amount (A) of 2.0 was continuously fed to the first esterification reactor containing a remaining reaction product, and esterification reaction was conducted with stirring under the conditions of 250° C., 0.05 MPa in such a manner that the average residence time became 3 hours. This reaction product was transferred to the second esterification reactor, and esterification reaction was conducted with stirring under the conditions of 260° C., 0.05 MPa in such a manner that the average residence time became 1 hour. This reaction product was transferred to the third esterification reactor, and esterification reaction was conducted with stirring under the conditions of 260° C. at atmospheric pressure until a predetermined esterification rate was achieved.

The oligomer obtained at this time had an AVo of 380 eq/ton, OHVo of 1200 eq/ton and OH % of 0.76. To this oligomer in the third esterification reactor was continuously fed a 12 g/L EG solution of antimony trioxide so that antimony trioxide would be 0.022 mol %.

The product resulting from the esterification reaction was continuously fed to the first polycondensation reactor to conduct polycondensation with stirring at 265° C., 4500 Pa for 1 hour, then in the second polycondensation reactor with stirring at 270° C., 500 Pa for 1 hour, and further in the final polycondensation reactor with stirring at 280° C., 80 Pa for 1 hour. The obtained polyester was pelletized and dried in the same manner as in Example 1.

The obtained polyester S had an intrinsic viscosity of 0.78 dl/g and a copolymerized polyester having a high degree of polymerization was obtained with superior productivity.

The polyester S was non-crystalline, had a composition of TPA//EG/CHDM/DEG=100//68.5/30.5/1.0 (molar ratio) and contained 0.022 mol % of antimony trioxide. In the polyester S composition, DEG (diethylene glycol) was a by-product occurred during the reaction. Polyester S had a color L value of 40 and a color b value of 1.0.

EXPERIMENTAL EXAMPLE 2

A continuous type polymerization equipment was used.

A slurry adjusted to have a ratio of added amounts of high purity terephthalic acid (TPA), ethylene glycol (EG), and neopentyl glycol (NPG) of TPA//EG/NPG=100//83/17 (molar ratio) and a ratio (G/A) of the entire glycol component/ entire acid component of 1.7 was continuously fed in the amount of 1 ton/h as a resulting polyester, to the first esterification reactor containing a remaining reaction product, and a 12 g/L EG solution of antimony trioxide was continuously fed, so that antimony trioxide would be 0.025 mol % relative to the resulting polyester. Then, esterification reaction was conducted with stirring under the conditions of 255° C., 0.05 MPa in such a manner that the average residence time became 3.5 hours. This reaction product was transferred to the second esterification reactor, and esterification reaction was conducted with stirring under the conditions of 260° C. at atmospheric pressure in such a manner that the average residence time became 1 hour, and esterification reaction was conducted until a predetermined esterification rate was achieved.

The oligomer obtained at this time had an AVo of 490 eq/ton, OHVo of 1230 eq/ton and OH % of 0.72.

To the second esterification reactor were continuously fed a 65 g/L EG solution of trimethyl phosphate and a 50 g/L EG solution of cobalt acetate 4 hydrate from separate supply openings so that trimethyl phosphate would be 0.007 mol %, and cobalt acetate 4 hydrate would be 0.007 mol %, relative to the resulting polyester.

The product resulting from the esterification reaction was continuously fed to the first polycondensation reactor to conduct polycondensation with stirring at 265° C., 35 hPa for 1 hour, then in the second polycondensation reactor with stirring at 265° C., 5 hPa for 1 hour, and further in the final polycondensation reactor with stirring at 275° C., 0.5 to 1.5 hPa for 1 hour. The obtained polyester was pelletized and dried in the same manner as in Example 1.

The obtained polyester T had an intrinsic viscosity of 0.75 dl/g and a copolymerized polyester having a high degree of polymerization was obtained with superior productivity.

The polyester T was non-crystalline, had a composition of TPA//EG/NPG/DEG=100//70.2/28.3/1.5 (molar ratio), and the composition ratio of the catalyst and additive in polyester T was Sb/P/Co=0.0245/0.007/0.007 (mol % ratio). In this polyester T composition, DEG (diethylene glycol) was a by-product occurred during the reaction.

INDUSTRIAL APPLICABILITY

The amorphous polyester chip of the present invention has a low moisture content, and a low fine particle content. Therefore, segregation, decrease in molecular weight and crystallization can be suppressed, which in turn enables production of a high quality subsequently formed product having superior mechanical strength and transparency, and a small variation in the polymer composition. Furthermore, since not only moisture content and fine particle content but also crude by-product is small, high quality formed products can be subsequently formed with fine processing operability.

In addition, since a particular copolymerized polyester chip has high transparency and good solvent adhesiveness, a film obtained therefrom is particularly preferable for a heat shrinkable film. In other words, an amorphous polyester film having high transparency and fine solvent adhesiveness can be formed from the inventive polyester chip.

Furthermore, since a particular copolymerized polyester chip is superior in formability, contains only a small amount of unmelted foreign substance, and is superior in electrostatic adhesion, it is useful not only as a starting material for a film but also as a starting material for various subsequently formed products such as blow molded container, engineering plastic, fiber and the like.

This application is based on a patent application No. 109688/2002 filed in Japan, the contents of which are hereby incorporated by reference.

The invention claimed is:

1. An amorphous polyester chip having a moisture content of 300 ppm or less, which comprises fine particles of amorphous polyester in a content of 500 ppm or less with respect to the mass of the amorphous polyester chip and particles, which is a copolymerized polyester chip obtained by copolymerization of polyethylene terephthalate with a dicarboxylic acid component other than terephthalic acid and/or a glycol component other than ethylene glycol, and which does not show a melting point (peak),
   wherein the dicarboxylic acid component is selected from the group consisting of isophthalic acid, 2,6-naphthalenedicarboxylic acid, diphenyl-4-4'-dicarboxylic acid, diphenoxyethanedicarboxylic acid, p-oxybenzoic acid, oxycaproic acid, adipic acid, sebacic acid, succinic acid, glutaric acid and 1,4-cyclohexanedicarboxylic acid, and
   wherein the amount of terephthalic acid component in the entire dicarboxylic acid component is not less than 70 mol %;
   wherein the glycol component is selected from the group consisting of diethylene glycol, trimethylene glycol, tetramethylene glycol, neopentyl glycol, 1,4-cyclohexanedimethanol, bisphenol A and alkylene oxide adduct of bisphenol A, and
   wherein the amount of ethylene glycol component in the entire glycol component is not less than 50 mol % and not more than 88 mol %;
   wherein a melting point (peak) is a clear melting peak in two temperature-raising processes including raising at a rate of 20° C./min from −100° C. to 300° C., followed by immediate cooling with liquid nitrogen, and raising again at a rate of 20° C./min from −100° C. to 300° C., using a differential scanning calorimeter; and
   wherein a fine particle means a particle contained in said polyester chip, which is measured according to JIS-Z8801 as a particle that passes through a stainless net sieve of nominal size 1.7 mm, wire diameter 0.8 mm, and that does not pass through a glass filter having a pore size of 100 to 120 μm.

2. The amorphous polyester chip of claim 1, which has a crude by-product content of not more than 2 wt %; wherein crude by-product is defined as a crude chip having a larger size than the specified size measured according to JIS-Z8801 as a by-product collected by passing through a stainless net sieve of nominal size 5.6 mm, wire diameter 1.6 mm, which, after washing with ion exchange water and filtering using a glass filter having a pore size of 100 to 120 μm, does not pass through the glass filter.

3. The amorphous polyester chip of claim 1, which is a copolymerized polyester chip comprising
   a major repeating unit consisting of ethylene terephthalate and 1,4-dimethylene-cyclohexane terephthalate or
   a major repeating unit consisting of ethylene terephthalate and neopentyl terephthalate.

4. The amorphous polyester chip of claim 3, wherein the copolymerized polyester chip comprises terephthalic acid as a major dicarboxylic acid component, and 50 to 85 mol % of ethylene glycol, 12 to 45 mol % of 1,4-cyclohexanedimethanol or neopentyl glycol and 1.5 to 7.0 mol % of diethylene glycol, each relative to the entire glycol component.

5. The amorphous polyester chip of claim 3, wherein the copolymerized polyester
   is obtained using, as a polymerization catalyst, at least one compound selected from an antimony compound, a germanium compound and a titanium compound, and
   is a polyester
      comprising
         an amount satisfying any of not less than 0.009 mol % of an antimony compound, not less than 0.005 mol % of a germanium compound and not less than 0.002 mol % of a titanium compound, and
         all of not more than 0.045 mol % of an antimony compound, not more than 0.075 mol % of a germanium compound and not more than 0.023 mol % of a titanium compound,
   all relative to said polyester, and
   showing an intrinsic viscosity of 0.70 to 0.85 dl/g.

6. The amorphous polyester chip of claim 3, wherein the copolymerized polyester comprises ethylene terephthalate and 1,4-dimethylene-cyclohexane terephthalate as major repeating units and is a polyester which comprises an alkali metal compound, an alkaline earth metal compound and a phosphorus compound, and which comprises an alkali metal compound (M1), an alkaline earth metal compound (M2) and a phosphorus compound (P) in proportions satisfying the following formulas (I) to (IV), relative to said polyester:

$$0.005 \leq M1 (\text{mol \%}) \leq 0.029 \quad \text{(I)}$$

$$0.045 \leq M2 (\text{mol \%}) \leq 0.225 \quad \text{(II)}$$

$$1.67 \leq M2/M1 (\text{molar ratio}) \leq 45 \quad \text{(III)}$$

$$0.5 \leq (M1 \pm M2)/P (\text{molar ratio}) \leq 3.0 \quad \text{(IV)}.$$

7. The amorphous polyester chip of claim 3, wherein the copolymerized polyester comprises ethylene terephthalate and neopentyl terephthalate as major repeating units and is a polyester which comprises an alkali metal compound, an alkaline earth metal compound and a phosphorus compound, and which comprises an alkali metal compound (M1), an alkaline earth metal compound (M2) and a phosphorus compound (P) in proportions satisfying the following formulas (V) to (VII), relative to said polyester:

$$0.005 \leq M1 (\text{mol \%}) \leq 0.050 \quad \text{(V)}$$

$$0.05 \leq M2 (\text{mol \%}) \leq 0.40 \quad \text{(VI)}$$

$$1.0 \leq M2/P (\text{molar ratio}) \leq 3.5 \quad \text{(VII)}.$$

8. An amorphous polyester chip in a moisture-proof container, which houses and seals an amorphous polyester chip of claim 1.

* * * * *